United States Patent [19]

Kajiura et al.

[11] Patent Number: 4,614,778

[45] Date of Patent: Sep. 30, 1986

[54] RANDOM COPOLYMER

[76] Inventors: Hirokazu Kajiura, 2-7, Misono 1-chome, Ohtake-shi, Hiroshima-ken; Hidekuni Oda, 64-16, Muronoki-cho, 4-chome, Iwakuni-shi, Yamaguchi-ken; Syuji Minami, 2,5, Misono 1-chome, Ohtake-shi, Hiroshima-ken, all of Japan

[21] Appl. No.: 696,161

[22] Filed: Jan. 29, 1985

[30] Foreign Application Priority Data

Feb. 3, 1984 [JP] Japan ............................ 59-16995
Nov. 12, 1984 [JP] Japan ............................ 59-236828

[51] Int. Cl.$^4$ ............................................ C08F 232/06
[52] U.S. Cl. .................................... 526/281; 526/169.2
[58] Field of Search ........................... 526/281, 169.2

[56] References Cited

U.S. PATENT DOCUMENTS

| | | | |
|---|---|---|---|
| 3,657,204 | 4/1972 | Cesca | 526/169.2 |
| 4,400,501 | 8/1983 | Lane | 526/281 |
| 4,410,691 | 10/1983 | Lane | 526/281 |
| 4,410,692 | 10/1983 | Tenney | 526/281 |

*Primary Examiner*—Paul R. Michl

[57] ABSTRACT

A random copolymer comprising ethylene, a 1,4,5,8-dimethano-1,2,3,4,4a,5,8,8a-octahydronaphthalene and optionally an alpha-olefin having at least three carbon atoms or cycloolefin. The mole ratio of polymerized units from the 1,4,5,8-dimethano-1,2,3,4,4a,5,8,8a-octahydronaphthalene to polymerized units from ethylene is from 3:97 to 95:5 and the 1,4,5,8-dimethano-1,2,3,4,4a,5,8,8a-octahydronaphthalene is incorporated in the polymer chain as polymerized units without ring-opening.

The copolymer is prepared by copolymerizing ethylene with the 1,4,5,8-dimethano-1,2,3,4,4a,5,8,8a-octahydronaphthalene in a hydrocarbon medium in the presence of a catalyst formed from a vanadium compound and an organoaluminum compound which are soluble in the hydrocarbon medium.

The copolymer has excellent transparency and a well balanced combination of heat resistance, heat aging resistance, chemical and solvent resistance, dielectric properties and mechanical properties such as rigidity.

24 Claims, No Drawings

RANDOM COPOLYMER

This invention relates to a novel random copolymer comprising at least ethylene and a 1,4,5,8-dimethano-1,2,3,4,4a,5,8,8a-octahydronaphthalene as monomers. More specifically, it relates to a novel random copolymer having excellent transparency and a well balanced combination of heat resistance, heat aging resistance, chemical and solvent resistance, dielectric properties and mechanical properties such as rigidity.

Polycarbonate, poly(methyl methacrylate) and poly(ethylene terephthalate) are known as synthetic resins having excellent transparency. The polycarbonate resin has excellent heat resistance, heat aging resistance and impact strength as well as excellent transparency, but have the defect of poor chemical resistance whereby it is readily attacked by strong alkalies. Poly(methyl methacrylate) has the defect that it is susceptible to attack by ethyl acetate, acetone and toluene, is swollen in ether, and has low heat resistance. Polyethylene terephthalate has excellent heat resistance and mechanical properties but has the defect of possessing weak resistance to strong acids or alkalies and being susceptible to hydrolysis.

Many of polyolefins well known as general-purpose resins have excellent chemical resistance, solvent resistance and mechanical properties, but have poor heat resistance. Furthermore, they have poor transparency because they are crystalline. The transparency of polyolefins is generally improved by adding a nucleating agent to render the crystal structure fine, or by performing quenching to stop the growth of crystals, but such measures have not proved to be entirely effective. Rather, the addition of a third component such as the nucleating agent is likely to impair the inherent excellent properties of the polyolefins. Furthermore, the quenching method requires large scale equipment, and is also likely to reduce heat resistance or rigidity with a decrease in crystallinity.

On the other hand, methods have been proposed for producing polymers having superior transparency by copolymerizing ethylene with bulky comonomers. U.S. Pat. No. 2,883,372 discloses a copolymer of ethylene with 2,3-dihydrodicyclopentadiene. This copolymer has a well balanced combination of rigidity and transparency but low heat resistance as shown by its glass transition temperature of about 100° C.

Japanese Patent Publication No. 14,910/1971 discloses a process for producing a homo- or co-polymer having polymerized units represented by the following formula (a)

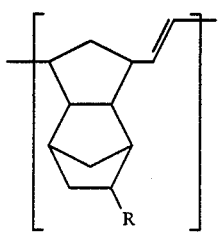

(a)

wherein R is hydrogen or a lower alkyl group, which comprises polymerizing a 1,4,5,8-dimethano-1,2,3,4,4a,5,8,8a-octahydronaphthalene represented by the following formula (b)

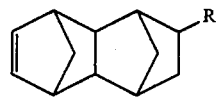

(b)

wherein R is as defined above, alone or with a cyclic olefin selected from styrene, acenaphthylene, bicyclo[2.2.1]heptene-2, alkyl-substituted products of the heptene and cyclopentene in the presence of an alcohol as a reducing agent using a halide of a noble metal such as ruthenium as a catalyst.

Homo- or co-polymers comprising the 1,4,5,8-dimethano-1,2,3,4,4a,5,8,8a-octahydronaphthalene as a part or the whole of monomers and methods for production thereof are also disclosed in Japanese Laid-Open Patent Publications Nos. 159,598/1975, 127,728/1983, 51,911/1984, 81,315/1984 and 81,316/1984 and U.S. Pat. No. 4,178,424.

The polymers disclosed in these prior art documents are ring-opened polymers having polymerized units resulting from ring-opening of monomers as in the polymerized units represented by formula (a). As can be understood from the formula (a), these ring-opened polymers are structurally characterized by the fact that the main polymer chain contains an unsaturated vinyl linkage. Because of the presence of the unsaturated vinyl linkage, these polymers have poor heat aging resistance.

All of the polymers described in the above prior art documents are ring-opened polymers obtained by the ring scission of monomer. U.S. Pat. Nos. 3,330,815 and 3,494,897 and Journal of Polymer Science: Polymer Physics Edition, volume 12, 1607–1618 (1974) describe polymers of the type obtained by the opening of the double bond of monomer without the ring scission of the bicyclohept-2-ene skeleton of the monomer.

U.S. Pat. No. 3,330,815 discloses that a polymer comprising polymerized units of the following formula (c)

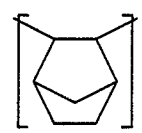

(c)

or the substitution product thereof is obtained from bicyclo[2.2.1]hept-2-ene of the following formula (d)

(d)

or its substitution product.

U.S. Pat. No. 3,494,897 discloses a process for producing a copolymer of ethylene with a bicyclo[2.2.1]hept-2-ene represented by the following formula (e)

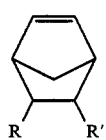

(e)

Example 44 and claim 92 of this patent discloses a copolymer of ethylene with tetracyclo[6,2,1,1$^{3,6}$,0$^{2,7}$]-4-dodecene of the following formula (f) encompassed within the formula (e)

(f)

and ethylene. The Patent does not describe the content of the tetracyclododecene of the copolymer of Example 44. When it is calculated under the assumption that all of the tetracyclododecene charged was introduced into the polymer, the polymer contains polymerized units derived from about 2 mole % at most of the tetracyclododecane. U.S. Pat. No. 3,494,897 does not at all describe specifically copolymers of ethylene with tetracyclododecenes other than the tetracyclo[6,2,1,1$^{3,6}$,0$^{2,7}$]-4-dodecene of formula (f).

Journal of Polymer Science: Polymer Physics Edition, volume 12, 1607–1618 (1974) discloses copolymers of ethylene and norbornene derivatives having dynamic mechanical properties. Table II of this document shows a copolymer of ethylene containing 1 mole % of polymerized units derived from the same compound as formula (f) (named octahydrodimethanonaphthalene in this document). Table IV thereof states that this copolymer has a beta-relaxation temperature of 15° C.

The copolymers described in these prior art references which contain only 2% at the largest of octahydrodimethanonaphthalene have a glass transition temperature of about 15° C. at the highest. They strongly exhibit a rubbery nature and have poor heat resistance and mechanical properties.

It is an object of this invention to provide a novel random copolymer comprising at least ethylene and a 1,4,5,8-dimethano-1,2,3,4,4a,5,8,8a-octahydronaphthalene as monomers.

Another object of this invention is to provide a novel random copolymer having excellent transparency and a well balanced combination of heat resistance, heat aging resistance, chemical and solvent resistance, dielectric properties and mechanical properties such as rigidity.

Further objects and advantages of this invention will become apparent from the following description.

These objects and advantages are achieved by a novel random copolymer, characterized in that (A) it is composed of ethylene and a 1,4,5,8-dimethano-1,2,3,4,4a,5,8,8a-octahydronaphthalene represented by the following formula (1)

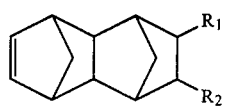
(1)

wherein R$_1$ and R$_2$ are identical and different and each represents a hydrogen atom, a halogen atom or an alkyl group, or R$_1$ and R$_2$ may be bonded to each other to form a trimethylene group or a group represented by the following formula

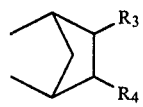

in which R$_3$ and R$_4$ are identical or different and each represents a hydrogen atom, a halogen atom or an alkyl group, (B) the mole ratio of polymerized units derived from 1,4,5,8-dimethano-1,2,3,4,4a,5,8,8a-octahydronaphthalene to polymerized units derived from ethylene is from 3.97 to 95:5, and (C) the 1,4,5,8-dimethano-1,2,3,4,4a,5,8,8a-octahydronaphthalene is incorporated in the polymer chain as polymerized units represented by the following formula (2)

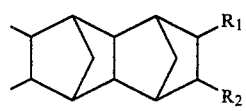
(2)

wherein R$_1$ and R$_2$ are as defined above.

According to this invention, the novel copolymer of the invention is produced by a process which comprises copolymerizing ethylene with a 1,4,5,8-dimethano-1,2,3,4,4a,5,8,8a-octahydronaphthalene represented by the following formula (1)

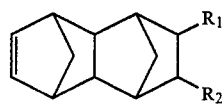
(1)

wherein R$_1$ and R$_2$ are identical and different and each represents a hydrogen atom, a halogen atom or an alkyl group, or R$_1$ and R$_2$ may be bonded to each other to form a trimethylene group or a group represented by the following formula

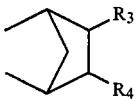

in which R$_3$ and R$_4$ are identical or different and each represents a hydrogen atom, a halogen atom or an alkyl group, in a hydrocarbon medium in the presence of a catalyst formed from a vanadium compound and an organoaluminum compound which are soluble in the hydrocarbon medium.

The 1,4,5,8-dimethano-1,2,3,4,4a,5,8,8a-octahydronaphthalene, i.e. a tetracyclo[6,2,1,1$^{3,6}$,0$^{2,7}$]-4-dodecene, used in this invention is represented by the above formula (1). In formula (1), R$_1$ and R$_2$ are identical or different and each represents a hydrogen atom, a halogen atom or an alkyl group. Or R$_1$ and R$_2$ are bonded to each other to form a trimethylene group or a group of the following formula

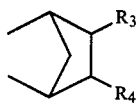

wherein R₃ and R₄ are identical or different and each represents a hydrogen atom, a halogen atom or an alkyl group.

Examples of the halogen atom for $R_1$ to $R_4$ are fluorine, chlorine and bromine. The alkyl group for $R_1$ to $R_4$ may be linear or branched, and preferably has 1 to 20 carbon atoms, particularly 1 to 10 carbon atoms. Examples of the alkyl group include methyl, ethyl, n-propyl, isopropyl, n-butyl, iso-butyl, sec-butyl, t-butyl, pentyl, hexyl, heptyl, octyl, nonyl and decyl.

Examples of the 1,4,5,8-dimethano-1,2,3,4,4a,5,8,8a-octahydronaphthalene of formula (1) include
1,4,5,8-dimethano-1,2,3,4,4a,5,8,8a-octahydronaphthalene,
2-methyl-1,4,5,8-dimethano-1,2,3,4,4a,5,8,8a-octahydronaphthalene,
2-ethyl-1,4,5,8-dimethano-1,2,3,4,4a,5,8,8a-octahydronaphthalene,
2-propyl-1,4,5,8-dimethano-1,2,3,4,4a,5,8,8a-octahydronaphthalene,
2-hexyl-1,4,5,8-dimethano-1,2,3,4,4a,5,8,8a-octahydronaphthalene,
2-stearyl-1,4,5,8-dimethano-1,2,3,4,4a,5,8,8a-octahydronaphthalene,
2-decyl-1,4,5,8-dimethano-1,2,3,4,4a,5,8,8-octahydronaphthalene,
2,3-dimethyl-1,4,5,8-dimethano-1,2,3,4,4a,5,8,8-octahydronaphthalene,
2,3-dimethyl-3-ethyl-1,4,5,8-dimethano-1,2,3,4,4a,5,8,8a-octahydronaphthalene,
2-methyl-3-ethyl-1,4,5,8-dimethano-1,2,3,4,4a,5,8,8a-octahydronaphthalene,
2-chloro-1,4,5,8-dimethano-1,2,3,4,4a,5,8,8a-octahydronaphthalene,
2-bromo-1,4,5,8-dimethano-1,2,3,4,4a,5,8,8a-octahydronaphthalene,
2-fluoro-1,4,5,8-dimethano-1,2,3,4,4a,5,8,8a-octahydronaphthalene,
2-cyclohexyl-1,4,5,8-dimethano-1,2,3,4,4a,5,8,8a-octahydronaphthalene,
2-isobutyl-1,4,5,8-dimethano-1,2,3,4,4a,5,8,8a-octahydronaphthalene,
2,3-dichloro-1,4,5,8-dimethano-1,2,3,4,4a,5,8,8a-octahydronaphthalene,
12-ethyl-hexacyclo[6,6,1,1$^{3,6}$,1$^{10,13}$,0$^{2,7}$,0$^{9,14}$]-heptadecene-4,
12-methyl-hexacyclo[6,6,1,1$^{3,6}$,1$^{10,13}$,0$^{2,7}$,0$^{9,14}$]-heptadecene-4,
12-isobutyl-hexacyclo[6,6,1,1$^{3,6}$,1$^{10,13}$,0$^{2,7}$,0$^{9,14}$]-heptadecene-4,
hexacyclo[6,6,1,1$^{3,6}$,1$^{10,13}$,0$^{2,7}$,0$^{9,14}$]heptadecene-4, and
pentacyclo[6,5,1,1$^{3,6}$,0$^{2,7}$,0$^{9,13}$]pentadecene-4.

These 1,4,5,8-dimethano-1,2,3,4,4a,5,8,8a-octahydronaphthalenes may be used singly or in combination.

Among the compounds of formula (1), those in which at least one of $R_1$ and $R_2$ is an alkyl group, especially having 1 to 10 carbon atoms, above all 1 to 5 carbon atoms, or $R_1$ and $R_2$ are bonded together to form a trimethylene group or a group of the formula

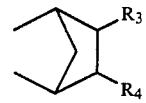

wherein R₃ and R₄ are as defined above, and preferably represent an alkyl group having an alkyl group with 1 to 10 carbon atoms, especially 1 to 5 carbon atoms, are preferred.

The compound of formula (1) can be produced, for example, by subjecting the corresponding norbornene and cyclopentadiene to the Diels-Alder reaction.

According to the process of this invention, the 1,4,5,8-dimethano-1,2,3,4,4a,5,8,8a-octahydronaphthalene of formula (1) is copolymerized with ethylene in a hydrocarbon solvent in the presence of a catalyst.

The catalyst used is one formed from a vanadium compound and an organoaluminum compound which are soluble in the hydrocarbon solvent used.

Suitable vanadium compounds include vanadium halides such as $VCl_4$, $VBr_4$, $VCl_3$ and $VBr_3$; vanadium oxyhalides such as $VOCl_3$, $VOBr_3$, $VOCl_2$ and $VOBr_2$; and vanadium compounds of the formula $VO(OR)_nX_{3-n}$ wherein R represents a hydrocarbon group, X represents a halogen atom, and n is a number represented by $0 < n \leq 3$. Of these, hydrocarbon-soluble vanadium compounds, particularly the vanadium oxyhalides and the compounds of the formula $VO(OR)_nX_{3-n}$ are preferred. In the compounds of the formula $VO(OR)_nX_{3-n}$, R is an aliphatic, alicyclic or aromatic hydrocarbon group, preferably an aliphatic hydrocrbon group with 1 to 20, preferably 1 to 5, especially preferably 1 to 3, carbon atoms. The number n is $0 < n \leq 3$, preferably $1 \leq n \leq 1.5$. Specific examples of these vanadium compounds are $VO(OCH_3)Cl_2$, $VO(OCH_3)_2Cl$, $VO(OCH_3)_3$, $VO(OC_2H_5)Cl_2$, $VO(OC_2H_5)_{1.5}Cl_{1.5}$, $VO(OC_2H_5)_2Cl$, $VO(OC_2H_5)_3$, $VO(OC_2H_5)_{1.5}Br_{1.5}$, $VO(OC_3H_7)Cl_2$, $VO(OC_3H_7)_{1.5}Cl_{1.5}$, $VO(OC_3H_7)_2Cl$, $VO(OC_3H_7)_3$, $VO(O\ n-C_4H_9)Cl_2$, $VO(O\ n-C_4H_9)_2Cl$, $VO(O\ iso-C_4H_9)_2Cl$, $VO(O\ sec-C_4H_9)_3$, and $VO(OC_5H_{11})_{1.5}Cl_{1.5}$. Mixtures of these may also be used. These vanadium compounds can easily be obtained by, for example, reacting $VOCl_3$ with alcohols, or $VOCl_3$ with $VO(OR)_3$.

Suitable organoaluminum compounds used together with the vanadium compounds are compounds represented by the general formula $R'_mAlX'_{3-m}$ wherein R' represents a hydrocarbon group, preferably an aliphatic, aromatic or alicyclic hydrocarbon group having 1 to 20 carbon atoms, especially 1 to 10 carbon atoms, X' represents a halogen atom, especially fluorine, chlorine or bromine, and m is a number represented by $0 < m \leq 3$. Halogen-containing organoaluminum compounds of the above formula in which m has an average value represented by $1 \leq m \leq 2$, particularly $1.2 \leq m \leq 1.8$, are preferred. Specific examples of these organoaluminum compounds are trialkyl aluminums such as triethyl aluminum, triisopropyl aluminum, triisobutyl aluminum, tri(n-propyl) aluminum and tri(n-butyl) aluminum; dialkyl aluminum monohalides such as diethyl aluminum monochloride, diethyl aluminum monobromide, diisopropyl aluminum monochloride, diisopropyl aluminum monobromide, di(n-propyl) aluminum monochloride, di(isobutyl) aluminum monochloride, di(n-butyl) aluminum monochloride, di(sec-butyl) aluminum monochloride, di(n-pentyl) aluminum monochloride and dioctyl aluminum monochloride; alkyl aluminum sesquihalides such as ethyl aluminum sesquichloride, isopropyl aluminum sesquichloride, n-propyl aluminum sesquichloride, n-butyl aluminum sesquichloride, n-pentyl aluminum sesquichloride and n-octyl aluminum sesquichloride; and alkyl aluminum dihalides such as ethyl aluminum dichloride, ethyl aluminum dibromide, isopropyl aluminum dichloride, isopropyl aluminum dibromide, n-propyl aluminum dichloride, n-propyl aluminum dibromide, n-butyl aluminum dichloride, isobutyl aluminum dichloride, sec-butyl aluminum dichloride, n-pentyl aluminum dichloride and n-octyl aluminum dichloride. Mixtures of these may also be used.

The ratio of the organoaluminum compound to the vanadium compound, in terms of the mole ratio of Al to V, is at least 1, preferably not more than 30, especially preferably from 2 to 20.

The copolymerization is carried out in a hydrocarbon solvent. Examples of the solvent include aliphatic hydrocarbons having 5 to 15 carbon atoms such as pentane, hexane, heptane, octane and kerosene; alicyclic hydrocarbons having 5 to 15 carbon atoms such as cyclopentane and cyclohexane; and aromatic hydrocarbons having 6 to 15 carbon atoms such as benzene, toluene and xylene. These solvents may be used singly or in combination.

Preferably, the copolymerization is carried out such that the concentration of the vanadium compound in the reaction medium is from 0.05 to 20 millimoles/liter, preferably 0.1 to 10 millimoles/liter. The organoaluminum compounds is used in such a concentration that the Al/V mole ratio becomes at least 1, preferably not more than 30, especially preferably from 2 to 20.

The ratio of ethylene to the compound of formula (1) varies according to the composition of the desired copolymer, the type of the reaction medium, the polymerization temperature, etc. Generally, the mole ratio of ethylene to the compound of formula (1) is adjusted to 100:1 to 1:100, preferably 50:1 to 1:50.

The polymerization temperature is from $-50°$ to $100°$ C., preferably from $-30°$ to $80°$ C. The polymerization pressure is maintained generally at 0 to 50 kg/cm$^2$, preferably at 0 to 20 kg/cm$^2$. The molecular weight of the polymer may be controlled by using a molecular controlling agent such as hydrogen as required.

As a result, the process of this invention gives the random copolymer of this invention in which the mole ratio of polymerized units from the 1,4,5,8-dimethano-1,2,3,4,4a,5,8,8a-octahydronaphthalene of formula (1) to polymerized units from ethylene (measured by $^{13}$C-NMR analysis) is in the range of from 3:97 to 95:5. Preferably, the above mole ratio is from 5:95 to 80:20, more preferably from 10:90 to 80:20.

The compound of formula (1) is incorporated into the chain of the random copolymer of the invention as polymerized units of the following formula (2)

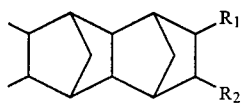

(2)

wherein R$_1$ and R$_2$ are as defined hereinabove. The random copolymers of the invention, therefore, have an iodine number of usually not more than 5, and most of them have an iodine number of not more than 2. The random copolymers of this invention have an intrinsic viscosity [η], measured in decalin at 135° C., of preferably 0.005 to 20 dl/g, more preferably 0.01 to 15 dl/g, especially preferably 0.05 to 10 dl/g.

The novel random copolymers of this invention are generally amorphous or of low crystallinity. Preferably, they are amorphous. Accordingly, they have good transparency. Generally, these copolymers have a crystallinity, determined by X-ray diffraction, of not more than 40%, preferably not more than 25%.

The copolymer of the invention has a melting point, determined by a differential scanning calorimeter (DSC), of not more than 135° C., preferably not more than 128° C. or does not show a melting point.

The superior heat resistance of the novel random copolymer of this invention can also be substantiated by its high glass transition temperature. Specifically, the novel random copolymer of the invention has a glass transition temperature (Tg), measured by a dynamic mechanical analyzer, of at least 25° C., preferably 30° to 220° C., more preferably 80° to 200° C.

The random copolymer of this invention has a density, determined by the density gradient tube method in accordance with ASTM D1505, of usually at least about 0.86 g/cm$^3$, preferably 0.94 to 1.30 g/cm$^3$, especially preferably 0.96 to 1.10 g/cm$^3$.

The random copolymer of this invention also has excellent electrical properties, and for example, has a dielectric constant, measured at 1 KHz, of 1.5 to 4.0, above all 1.7 to 2.6.

Novel random copolymers of this invention in which the mole ratio of the polymerized units from the 1,4,5,8-dimethano-1,2,3,4,4a,5,8,8a-octahydronaphthalene to the polymerized units from ethylene is from 10:90 to 90:10, preferably from 15:85 to 80:20 (measured by $^{13}$C-NMR analysis), and which have an intrinsic viscosity, measured in decalin at 135° C., of 0.3 to 15 dl/g, preferably 0.5 to 10 dl/g, a crystallinity, determined by X-ray diffraction, of not more than 25%, preferably not more than 10%, and a melting point, measured by a differential scanning calorimeter, of not more than 128° C., preferably not more than 100° C., and a glass transition temperature measured by a dynamic mechanical analyzer (DMA) made by Du Pont of at least 80° C., preferably 100° to 220° C. have excellent transparency, processability, heat resistance, heat aging resistance, chemical and solvent resistance, dielectric properties and mechanical properties such as rigidity. Accordingly, these copolymers can be used as a transparent resin in various fields including an optical field as optical lenses, optical disks, optical fibers and windowpanes, an electrical field as water tanks for electric irons, articles used for electronic ovens, substrates for liquid crystal display, substrates for printed circuit boards, substrates for high frequency circuits, and transparent electrically conductive sheets or films, medical and chemical fields as injection syringes, pipettes and animal gauges, and in other fields as camera bodies, housings of various measuring instruments, films, sheets and helmets.

Novel random copolymers of this invention in which the mole ratio of the polymerized units from the 1,4,5,8-dimethano-1,2,3,4,4a,5,8,8a-octahydronaphthalene to the polymerized units from ethylene is from 10:90 to 90:10, preferably from 15:85 to 80:20 (measured by $^{13}$C-NMR analysis), and which have an intrinsic viscosity, measured in decalin at 135° C., of 0.005 to 0.3 dl/g, preferably 0.01 to 0.3 dl/g, especially preferably 0.05 to 0.2 dl/g, a crystallinity, determined by X-ray diffraction, of not more than 25%, preferably not more than 10%, a melting point, measured by a differential scanning calorimeter, of not more than 128° C. preferably not more than 100° C., a glass transition temperature measured by a dynamic mechanical analyzer (DMA) made by Du Pont of at least 80° C., preferably 100° to 220° C., and a viscosity at 280° C. of 100 to $2 \times 10^5$ centipoises, preferably 100 to $2 \times 10^4$ centipoises are of relatively low molecular weight and have excellent transparency, heat resistance, heat aging resistance, dielectric properties and chemical and solvent resistance. Hence, they are useful as synthetic waxes in various applications. For example, these low-molecular-weight random copolymers of the invention can find extensive use as candles, impregnating agents for matchwood, paper processing agents, sizing agents, rubber antioxidants, waterproofing agents for cardboards, retarders for chemical fertilizers, heat accumulating agents, ceramic binders, electric insulations for paper condensers and electric wires and cables, neutron decelerating agents, textile processing aids, water-repelling agents for building materials, protecting agents for coatings, calendering agents, thixotropy imparting agents, hardness imparting agents for the cores of pencils and crayons, substrates for carbon ink, electrophotographic toners, lubricants for molding of synthetic resins, mold mold releasing agents, resin coloring agents, hot-melt adhesives, and lubricating greases.

Novel random copolymers of the invention in which the mole ratio of the polymerized units from the 1,4,5,8-dimethano-1,2,3,4,4a,5,8,8a-octahydronaphthalene to the polymerized units from ethylene is from 3:97 to 20:80, preferably from 5:95 to 10:90 (measured by $^{13}$C-NMR analysis), and which have an intrinsic viscosity, measured in decalin at 135° C., of 0.3 to 20 dl/g, preferably 1.0 to 20 dl/g, especially preferably 2 to 15 dl/g, a crystallinity, determined by X-ray diffraction, of not more than 10%, preferably not more than 5%, a melting point, measured by a differential scanning calorimeter of not more than 128° C., preferably not more than 100° C., and a glass transition temperature by DMA of 25° to 100° C., preferably 30° to 80° C., have excellent shape memorizing property and antivibration property in addition to excellent transparency, heat resistance, chemical and solvent resistance, electrical properties, optical properties and moldability, and show leather properties. Accordingly, they are useful as shape memorizing polymers and antivibration material.

According to this invention, there is also provided, as a copolymer having similar properties to the above random copolymers, a multi-component random copolymer which contains the polymerized units from the compound of formula (1) and ethylene and also polymerized units derived from at least one compound selected from the group consisting of alpha-olefins having at least 3 carbon atoms and cycloolefins.

The multi-component random copolymer of this invention is characterized in that (A) it is composed of at least one 1,4,5,8-dimethano-1,2,3,4,4a,5,8,8a-octahydronaphthalene of formula (1), ethylene and at least one compound selected from the group consisting of alpha-olefins having at least 3 carbon atoms and cycloolefins, (B) the mole ratio of polymerized units from the 1,4,5,8-dimethano-1,2,3,4,4a,5,8,8a-octahydronaphthalene to polymerized units from ethylene is from 3:97 to 95:5, (B')the mole ratio of polymerized units from at least one compound selected from the group consisting of alpha-olefins having at least 3 carbon atoms and cycloolefins to the polymerized units from the 1,4,5,8-dimethano-1,2,3,4,4a,5,8,8a-octahydronaphthalene is from 95:5 to 20:80, and (C) the 1,4,5,8-dimethano-1,2,3,4,4a,5,8,8a-octahydronaphthalene is incorporated in the polymer chain as polymerized units represented by the following formula (2)

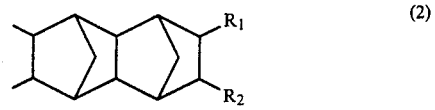

wherein $R_1$ and $R_2$ are as defined hereinabove.

The multi-component random copolymer of this invention is produced by copolymerizing the 1,4,5,8-dimethano-1,2,3,4,4a,5,8,8a-octahydronaphthalene of formula (1), ethylene and at least one compound selected from the group consisting of alpha-olefins having at least 3 carbon atoms and cycloolefins in a hydrocarbon medium in the presence of a catalyst formed from a vanadium compound and an organoaluminum compound.

The alpha-olefins having at least 3 carbon atoms may be linear or branched, and preferably contain 3 to 12 carbon atoms, especially 3 to 6 carbon atoms. Examples include propylene, isobutene, 1-butene, 3-methyl-1-butene, 1-pentene, 3-methyl-1-pentene, 4-methyl-1-pentene, 1-hexene, 1-octene, 1-decene and 1-dodecene.

It should be understood that the term "cycloolefins" broadly includes not only cycloolefins in the ordinary sense of the word, but also styrene and styrene derivatives and unsaturated polycyclic hydrocarbon compounds. Specific examples of the cycloolefins include cyclobutene, cyclopentene, cyclohexene, 3,4-dimethylcyclopentene, 3-methylcyclohexene, 2-(2-methylbutyl)-1-cyclohexene, styrene, alpha-methylstyrene, norbornene, methylnorbornene, ethylnorbornene, isobutylnorbornene, 2,3,3a,7a-tetrahydro-4,7-methano-1H-indene and 3a,5,6,7a-tetrahydro-4,7-methano-1H-indene. Of these, cycloolefins having a norbornene ring, such as norbornene, 5-methyl-2-norbornene, 5-ethyl-2-norbornene, and 5-isobutyl-2-norbornene, are preferred.

Examples of the vanadium compound and the organoaluminum compound which may be used as another component of the catalyst are the same as those given hereinabove.

The copolymerization is carried out in the aforesaid hydrocarbon medium. When the vanadium compound and the organoaluminum compound are used as the catalyst, the concentration of the former is adjusted to 0.01 to 50 millimoles/liter, preferably 0.01 to 10 millimoles/liter, and the concentration of the latter is adjusted such that the Al/V mole ratio is at least 2, preferably not more than 50, especially preferably 3 to 20. The vanadium-type catalyst is preferred for use in this invention.

In view of the properties of the final random copolymer or multicomponent random copolymer, the use of the catalyst composed of a vanadium compound and an organoaluminum compound is preferred in this invention. If desired, however, the vanadium compound in the catalyst may be replaced by a titanium or zirconium compound.

The ratio of the monomers charged varies according to the composition of the desired multi-component random copolymer, the type of the reaction medium, the polymerization temperature and pressure, and the type of the catalyst. Generally, the mole ratio of ethylene to the compound of formula (1) in the reaction medium is adjusted to 1:100 to 100:1, preferably 1:50 to 50:1. The mole ratio of the compound selected from the group consisting of alpha-olefins having at least 3 carbon atoms and cycloolefins to the compound of formula (1) is adjusted to 100:1 to 1:100, preferably 10:1 to 1:50.

The polymerization temperature is from $-30°$ to $80°$ C., and the polymerization pressure is maintained at 0 to 100 kg/cm$^2$, preferably at 0 to 50 kg/cm$^2$. A molecular weight controlling agent such as hydrogen may be added to control the molecular weight of the copolymer.

As a result, the above process of this invention gives the multi-component random copolymer of this invention in which the mole ratio of the polymerized units from the 1,4,5,8-dimethano-1,2,3,4,4a,5,8,8a-octahydronaphthalene of formula (1) to the polymerized units from ethylene is in the range of from 3:97 to 95:5, preferably from 5:95 to 80:20, and the mole ratio of the polymerized units from at least one compound selected from alpha-olefins having at least 3 carbon atoms and cycloolefins to the polymerized units from the 1,4,5,8-dimethano-1,2,3,4,4a,5,8,8a-octahydronaphthalene is in the range of from 95:5 to 20:80, preferably from 90:10 to 30:70.

The compound of formula (1) is incorporated in the chain of the multi-component random copolymer of this invention as the polymerized units represented by formula (2). Accordingly, the multi-component random copolymers of this invention also have an iodine number of usually not more than 5, and many of them have an iodine number of not more than 1.

The multi-component random copolymer of this invention has an intrinsic viscosity, measured in decalin at 135° C., of 0.005 to 20 dl/g, preferably 0.01 to 15 dl/g.

The multi-component random copolymer of this invention is generally amorphous or of low crystallinity; and preferably it is amorphous. Accordingly, it has good transparency. Generally, it has a crystallinity, determined by X-ray diffraction, of not more than 40%, preferably not more than 25%.

The multi-component random copolymer of the invention has a melting point, determined by a differential scanning calorimeter, of not more than 135° C., preferably not more than 128° C.

The superior heat resistance of the multi-component random copolymer of this invention is substantiated also by its high glass transition temperature. When measured by a dynamic mechanical analyser (DMA), the glass transition temperature (Tg) of the multi-component random copolymer of this invention is usually at least 2° C., mostly 30° to 220° C., especially 80° to 200° C.

The heat decomposition temperature of the multi-component random copolymer of this invention is usually in the range of 350° to 420° C., mostly in the range of 370° to 400° C. The heat decomposition temperature is the temperature at which weight loss begins when the sample is heated at a rate of 10° C./min in a stream of nitrogen by a thermobalance (TGA made by Rigaku Denki Co., Ltd.).

The multi-component random copolymer of this invention has a flexural modulus of usually in the range of $1\times10^4$ to $3\times10^4$ kg/cm$^2$, and a flexural yield strength of usually 300 to 1500 kg/cm$^2$.

It also has a density, determined by the density gradient tube method in accordance with ASTM D1505, of usually at least about 0.86 g/cm$^3$, for example 0.86 to 1.10 g/cm$^3$, and mostly 0.88 to 1.08 g/cm$^3$, and a refractive index, determined by ASTM D542, of 1.47 to 1.58, mostly 1.48 to 1.56. It is substantially amorphous, and its haze, determined by ASTM D1003, is usually not more than 20%, mostly not more than 10%.

Furthermore, the multi-component random copolymer of this invention has a dielectric constant of 1.5 to 4.0, mostly 1.7 to 2.6, and a dielectric tangent of $5\times10^{-3}$ to $5\times10^{-5}$, mostly $3\times10^{-4}$ to $9\times10^{-5}$, when they are measured in accordance with ASTM D150 at 1 KHz. It also has excellent chemical resistance and undergoes substantially no change when exposed to acids or alkalies.

The multi-component random copolymers of this invention may be used in the same applications as those which the random copolymers find. The relation of the properties of these multi-component random copolymers to their uses is the same as that described above for the random copolymer.

The novel random copolymers or multi-component random copolymers in accordance with this invention are molded by known methods. For example, they can be extrusion-molded, injection-molded, blow-molded, or rotationally molded by using, for example, a vent-type extruder, a twin-screw extruder, a conical twin-screw extruder, a Cokneader, a plsticator, a mixtruder, a twin conical screw extruder, a planetary screw extruder, a gear-type extruder, a screwless extruder, etc. In the molding process, known additives such as heat stabilizers, light stabilizers, antistatic agents, slip agents, antiblocking agents, antihaze agents, lubricants, inorganic and organic fillers, dyes and pigments may be used as required.

Phenolic or sulfur-type antioxidants may be cited as examples of such additives. The phenolic antioxidants include, for example, phenols such as 2,6-di-tert-butyl-p-cresol, stearyl (3,3,-dimethyl-4-hydroxybenzyl)thioglycolate, stearyl beta-(4-hydroxy-3,5-di-tert-butylphenol) propionate, distearyl 3,5-di-tert-butyl-4-hydroxybenzyl phosphate, 2,4,6-tris(3', 5'-di-tert-butyl-4'-hydroxybenzylthio)-1,3,5-triazine, distearyl (4-hydroxy-3-methyl-5-tert-butylbenzyl) malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis[4-hydroxy-3-tert-butylphenyl)butyric acid] glycol ester, 4,4'-butylidenebis(6-tert-butyl-m-cresol), 1,1,3-tris(2-methyl-4-hydroxy-5-tert-butylphenyl)butene, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butyl)benzyl isocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl) propionate]methane, 1,3,5-tris(3,5-di-tertbutyl-4-hydroxybenzyl) isocyanurate, 1,3,5-tris[(3,5-di-tert-butyl-4-hydroxyphenyl)propionyloxyethyl] isocyanurate, 2-octylthio-4,6-di(4-hydroxy-3,5-di-tert-butyl)phenoxy1,3,5-triazine and 4,4'-thiobis(6-tert-butyl-m-cresol); and polyhydric phenol/carbonic acid oligoesters such as carbonic acid oligoesters (for example, having a degree of polymerization of 2, 3, 4, 5, 6, 7, 8, 9, 10) of 4,4'-butylidenebis(2-tert-butyl-5-methylphenol).

Examples of the sulfur-type antioxidant include dialkyl thiodipropionates such as dilauryl, dimyristyl or distearyl thiodipropionate, and esters (such as pentaerythritol tetralaurylthiopropionate) formed between alkylthiopropionic acids such as butyl-, octyl-, lauryl- or stearylthiopropionic acid and polyhydric alcohols (such as glycerol, trimethylolethane, trimethylolpropane, pentarythritol or tris-hydroxyethyl diisocyanurate).

Phosphorous-containing compounds may also be incorporated. Examples include trioctyl phosphite, trilauryl phosphite, tridecyl phosphite, octyldiphenyl phosphite, tris(2,4-di-tert-butylphenyl) phosphite, triphenyl phosphite, tris(butoxyethyl) phosphite, tris(nonylphenyl) phosphite, distearyl pentaerythritol diphosphite, tetra(tridecyl)-1,1,3-tris(2-methyl-5-tert-butyl-4-hydroxyphenyl)butane diphosphite, tetra $C_{12}$–$C_{15}$ mixed alkyl)-4,4'-isopropylidenediphenyl diphosphite, tetra(tridecyl)-4,4'-butylidenebis(3-methyl-6-tert-butylphenol) diphosphite, tris(3,5-di-tert-butyl-4-hydroxyphenyl) phosphite, tris(mono-di-mixed nonylphenyl) phosphite, hydrogenated 4,4'-isopropylidene diphenol polyphosphite, bis(octylphenyl).bis[4,4'-butylidenebis(3-methyl-6-tert- butyl-phenol)].1,6-hexanediol diphosphite, phenyl-4,4'-isopropylidenediphenol-pentaerythritol diphosphite, bis-(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)] phosphite, phenyldiisodecyl phosphite, di(nonylphenyl)pentaerythritol diphosphite, tris(1,3-di-stearoyloxyisopropyl) phosphite, 4,4'-isopropylidenebis(2-tert-butylphenol)-di(nonylphenyl) phosphite, 9,10-dihydro-9-oxa-10-phosphaphenanthrene-10-oxide, and tetrakis(2,4-di-tertbutylphenyl)-4,4'-biphenylene diphosphonite.

There can also be used 6-hydroxycoumarone derivatives such as alpha-, beta-, gamma- and delta-tocopherols and mixtures thereof, a 2,5-dimethyl-substitution product, 2,5,8-trimethyl-substituted product or 2,5,7,8-tetramethyl-substituted product of 2-(4-methylpent-3-eny)-6-hydroxycoumarone, 2,2,7-trimethyl-5-tert-butyl-6-hydroxycoumarone, 2,2,5-trimethyl-7-tert-butyl-6-hydroxycoumarone, 2,2,5-trimethyl-6-tert-butyl-6-hydroxycoumarone, and 2,2-dimethyl-5-tert-butyl-6-hydroxycoumarone.

It is also possible to incorporate a compound represented by the general formula

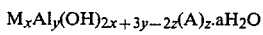

$M_xAl_y(OH)_{2x+3y-2z}(A)_z.aH_2O$ wherein M represents Mg, CA or Zn, A is an anion other than a hydroxyl anion, x, y and z are positive numbers, and a represents 0 or a positive number.

Examples of the compounds of the above formula are
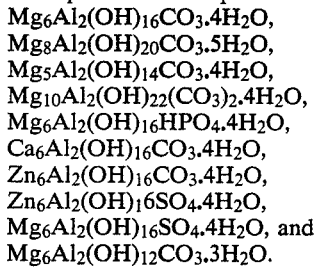
$Mg_6Al_2(OH)_{16}CO_3.4H_2O$,
$Mg_8Al_2(OH)_{20}CO_3.5H_2O$,
$Mg_5Al_2(OH)_{14}CO_3.4H_2O$,
$Mg_{10}Al_2(OH)_{22}(CO_3)_2.4H_2O$,
$Mg_6Al_2(OH)_{16}HPO_4.4H_2O$,
$Ca_6Al_2(OH)_{16}CO_3.4H_2O$,
$Zn_6Al_2(OH)_{16}CO_3.4H_2O$,
$Zn_6Al_2(OH)_{16}SO_4.4H_2O$,
$Mg_6Al_2(OH)_{16}SO_4.4H_2O$, and
$Mg_6Al_2(OH)_{12}CO_3.3H_2O$.

There may also be added an antioxidant having a 2-benzofuranone skeleton, such as 3-phenyl-2-benzofuranone and 3-phenyl-4,6-di-t-butyl-2-benzofuranone as disclosed in the specification of Japanese Laid-Open Patent Publication No. 501,181/1980.

Examples of the light stabilizers include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole and 2-(2'-hydroxy-3',5'-di-tert-amylphenyl)benzotriazole; benzoates such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds such as 2,2'-thiobis(4-tert-octylphenol) nickel salt, [2,2'-thiobis(4-tert-octylphenolate)]-n-butylamine nickel salt and (3,5-di-tert-butyl-4-hydroxybenzyl)phosphonic acid monoethyl ester nickel salt; substituted acryloniriles such as methyl alpha-cyano-beta-methyl-beta-(p-methoxyphenyl)-acrylate; oxalic acid dianilides such as N'-2-ethylphenyl-N-ethoxy-5-tert-butylphenyl oxalic acid diamide and N-2ethylphenyl-N'-2-ethoxyphenyl oxalic acid diamide; and hindered amine compounds such as bis(2,2,6,6-tetramethyl-4-piperidine)sebacate, poly[(6-(1,1,3,3-tetramethylbutyl)-imino)-1,3,5-triazine-2,4-diyl 4-(2,2,6,6-tetramethylpiperidyl)imino)hexamethylene]and a condensation product of dimethyl succinate and 2-(4-hydroxy-2,2,6,6-tetramethyl-1-piperidyl)ethanol.

Examples of the lubricants include aliphatic hydrocarbons such as paraffin wax, polyethylene wax and polypropylene wax; higher fatty acids such as capric acid, lauric acid, myristic acid, palmitic acid, margaric acid, stearic acid, arachidic acid and behenic cid; metal salts of higher fatty acids such as lithium, calcium, sodium, magnesium and potassium salts of the above-exemplified fatty acids; aliphatic alcohols such as palmityl alcohol, cetyl alcohol and stearyl alcohol; aliphatic amides such as caproic amide, caprylic amide, capric amide, lauric amide, myristic amide, palmitic amide and stearic amide; esters formed between fatty acids and alcohols; and fluorine compounds such as fluoroalkylcarboxylic acids metal salts thereof, and metal salts of fluoroalkylsulfonic acids.

Examples of the fillers include inorganic or organic fibrous fillers such as glass fibers, silver- or aluminum-coated glass fibers, stainless steel fibers, aluminum fibers, potassium titanate fibers, carbon fibers, whiskers, Kevlar ® fibers and superhigh elastic polyethylene fibers; and inorganic or organic powdery, granular or flaky fillers such as talc, calcium carbonate, magnesium hydroxide, calcium oxide, magnesium sulfate, graphite, nickel powder, silver powder, copper powder, carbon black, silver-coated glass beads, aluminum-coated glass beads, aluminum flakes, stainless steel flakes and nickel-coated graphite.

The novel random copolymers of this invention may be used as a blend with various known polymers. Examples of such known polymers are shown below.

Polymers derived from hydrocarbons having 1 or 2 unsaturated bonds

Polyolefins, such as polyethylene, polypropylene, polyisobutylene, poly(methylbutene-1), poly(4-methylpentene-1), poly(butene-1), polyisorpene, polybutadiene and polystyrene, or crosslinked products thereof.

Copolymers of the monomers constituting the above polymers with each other, such as ethylene/propylene copolymer, propylene/butene-1 copolymer, propylene/isobutylene copolymer, styrene/isobutylene copolymer, styrene/butadiene copolymer, terpolymers of ethylene, propylene and dienes such as hexadiene, bicyclopentadiene and 5-ethylidene-2-norbornene, and terpolymers of ethylene, butene-1 and dienes such as hexadiene, dicyclopentadiene and 5-ethylidene-2-norborne.

Blends, grafted polymers, and block copolymers of these polymers may also be cited.

(B) Halogen-containing vinyl polymers

Polyvinyl chloride, polyvinylidene chloride, polyvinyl fluoride, polychloroprene, and chlorinated rubbers.

(C) Polymers derived from alpha,beta-unsaturated carboxylic acids or the derivatives thereof Polyacrylate, polymethacrylate, polyacrylamide, and polyacrylonitrile.

Copolymers of the monomers constituting the above-exemplified polymers with other copolymerizable monomers, such as acrylonitrile/butadiene/styrene copolymer, acrylonitrile/styrene copolymer, and acrylonitrile/styrene/acrylate copolymer.

(D) Polymers derived from unsaturated alcohols, amines, acyl derivatives thereof, or acetals Polyvinyl alcohol, polyvinyl acetate, polyvinyl stearate, polyvinyl benzoate, polyvinyl maleate, polyvinyl butyral, polyallyl phthalate and polyallylmelamine.

Copolymers of the monomers constituting the above-exemplified polymers with other copolymerizable monomers, such as ethylene/vinyl acetate copolymer.

(E) Polymers derived from epoxides

Polyethylene oxide and polymer derived from bis-glycidyl ether.

(F) Polyacetals

Polyoxymethylene, polyoxyethylene, and polyoxymethylene containing ethylene oxide.

(G) Polyphenylene oxide (H) Polycarbonate (I) Polysulfone (J) Polyurethane and urea resins (K) Polyamides and copolyamides derived from diamines and dicarboxylic acids and/or aminocarboxylic acids or the corresponding lactams Nylon 6, nylon 66, nylon 11, and nylon 12.

(L) Polyamide-polyethers (M) Polyesters derived from dicarboxylic acids and dialcohols and/or hydroxycarboxylic acids or the corresponding lactones Polyethylene terephthalate, polybutylene terephthalate and poly(1,4-dimethylolcyclohexane terephthalate).

(N) Crosslinked polymers derived from aldehydes and phenols, urea or melamine

Phenol/formaldehyde resin, urea/formaldehyde resin, and melamine/formaldehyde resin.

(O) Alkyd resins

Glycerin/phthalic acid resin.

(P) Unsaturated polyester resins derived from co-polyesters of saturated and unsaturated dicarboxylic acids and polyhydric alcohols using vinyl compounds as crosslinking agents, and halogen-containing modified resins thereof.

(Q) Natural polymers

Cellulose, rubber and protein, or derivatives thereof, such as cellulose acetate, cellulose propionate, cellulose acetate and cellulose ether.

When the copolymers of this invention are used as synthetic waxes, they may, of course, be mixed with various known waxes.

The random copolymers of this invention may be used as a blend with each other.

The following examples illustrate the present invention in more detail. It should be understood however that the invention is not limited to these specific examples alone.

EXAMPLE 1

A thoroughly dried 3-liter separable flask was fitted with a stirring vane, a gas blowing inlet tube, a thermometer and a dropping funnel, and thoroughly purged with nitrogen.

One liter of toluene dehydrated and dried by molecular sieve was put into the flask.

While nitrogen was passed through the flask, 2 millimoles of dichloroethoxyoxovanadium and 30 g of 2-methyl-1,4,5,8-dimethano-1,2,3,4,4a,5,8,8a-octahydronaphthalene (to be abbreviated DMON hereinafter) were introduced into the flask, and 20 millimoles of ethyl aluminum sesquichloride, into the dropping funnel.

A gaseous mixture of dry ethylene (40 liters/hr) and nitrogen (160 liters/hr) was passed through the flask kept at 10° C. for 10 minutes through the gas blowing inlet tube.

The copolymerization reaction was started by adding ethyl aluminum sesquichloride from the dropping funnel, and carried out at 10° C. for 30 minutes while passing the above gaseous mixture.

The solution during the copolymerization reaction was uniform and transparent, and no precipitation of the copolymer was observed.

Methanol (10 ml) was added to the polymer solution to stop the copolymerization reaction.

After the stopping of the reaction, the polymer solution was poured into a large amount of methanol to precipitate the resulting copolymer. The precipitate was washed with methanol and with acetone, dried in vacuo for one day at 60° C. to obtain 35 g of the copolymer.

The copolymer had an ethylene content, measured by $^{13}$C-NMR analysis, of 60 mole %, an intrinsic viscosity, measured in decalin at 135° C., of 1.9, and an iodine number of 1.0.

To measure its dynamical properties, the copolymer was molded into sheets having a thickness of 1 and 2 mm by a hot press at 230° C. X-ray diffraction analysis of these sheets shows that no scattering by crystals was observed, and the sheets had a crystallinity ($W^c$) of 0%. Transparency was measured on the 1 mm-thick sheet by a haze meter in accordance with ASTM D1003-52, and found to be 10%. Flexural modulus and flexural yield strength were measured on the 2 mm-thick press sheet in accordance with ASTM D790, and were found to be $2.2 \times 10^4$ kg/cm$^2$ and 730 kg/cm$^2$, respectively. The glass transition temperature Tg was found to be 130° C. by measuring the loss modulus E" at a temperature elevating rate of 5° C./min. by a Dynamic Mechanical Analyzer made by Du Pont, and determining Tg from its peak temperature. To determine the melting point Tm, the sample was heated at a rate of 10° C./min. in the range of -120° to 400° C. by DSC (990 type made by Du Pont). The melting curve (peak) was not observed.

The dielectric constant and dielectric tangent (tan δ) of the sample, measured at 1 KHz by a dielectric loss measuring device made by Ando Electric Co., Ltd., were 1.9 and $9.1 \times 10^{-5}$, respectively.

To examine the chemical resistance of the sample, the press-formed sheet was immersed at room temperature in sulfuric acid (97%), aqueous ammonia (20%), acetone, and ethyl acetate for 20 hours, and then its appearance was observed. There was no change in color, reduction in transparency, deformation, dissolution, nor cracking.

Table 3 given below shows the heat decomposition temperature, dielectric constant and density of the copolymer obtained in this example.

EXAMPLES 2-10

The copolymerization reaction conditions were changed as shown in Table 1. Otherwise, the same operation as in Example 1 was performed. The conditions and the results are shown in Tables 1 to 3.

EXAMPLES 11-12 AND COMPARATIVE EXAMPLE 1

Example 1 was repeated except that a 500 ml flask was used instead of the 3-liter flask, the amount of toluene was changed from 1 liter to 250 ml, and the flow rate of N2 was changed from 160 liters/hr to 40 liters/hr. The results are shown in Tables 1 to 3.

TABLE 1

| Example | Catalyst VO(OEt)Cl$_2$ (mmoles) | Et$_3$Al$_2$Cl$_3$ (mmoles) | DMON (g) | Ethylene gas (l/hr) | Polymerization temperature (°C.) | Amount of the copolymer yielded (g) |
|---|---|---|---|---|---|---|
| 1 | 2 | 20 | 30[1] | 40 | 10 | 35 |
| 2 | 2 | 20 | 30[1] | 20 | 10 | 28 |
| 3 | 2 | 20 | 30[1] | 30 | 10 | 32 |
| 4 | 5 | 50 | 40 | 100 | 10 | 45 |
| 5 | 5 | 50 | 40 | 40 | 10 | 38 |
| 6 | 0.5 | 5 | 30 | 20 | 10 | 16 |
| 7 | 0.5 | 5 | 30 | 50 | 10 | 33 |
| 8 | 2 | 20 | 30[2] | 40 | 10 | 32 |
| 9 | 2 | 20 | 30[3] | 40 | 10 | 37 |
| 10 | 2 | 20 | 30[4] | 40 | 10 | 36 |
| 11 | 0.125 | 1.25 | 2.5 | 40 | 20 | 7.0 |
| 12 | 0.125 | 1.25 | 2.8 | 40 | 20 | 8.5 |
| Comp. Ex. 1 | 0.125 | 1.25 | 1.3 | 45 | 30 | 6.0 |

[1] 2-Methyl-1,4,5,8-dimethano-1,2,3,4,4a,5,8,8a-octahydronaphthalene
[2] 1,4,5,8-Dimethano-1,2,3,4,4a,5,8,8a-octahydronaphthalene
[3] 2-Ethyl-1,4,5,8-dimethano-1,2,3,4,4a,5,8,8a-octahydronaphthalene
[4] 2-iso-Butyl-1,4,5,8-dimethano-1,2,3,4,4a,5,8,8a-octahydronaphthalene

TABLE 2

| Example | [η] 135° C. dl/g | Ethylene content (mole %) | Iodine number | Tg (DMA) (°C.) | Tm (DSC) (°C.) | $W^c$ (X-rays) (%) | Haze (%) |
|---|---|---|---|---|---|---|---|
| 1 | 1.9 | 60 | 1.0 | 130 | — | 0 | 10 |
| 2 | 1.4 | 43 | 0.5 | 168 | — | 0 | 7 |
| 3 | 1.6 | 55 | 0.8 | 141 | — | 0 | 8 |
| 4 | 1.5 | 70 | 0.7 | 105 | — | 0 | 11 |
| 5 | 1.0 | 49 | 0.4 | 150 | — | 0 | 8 |
| 6 | 2.5 | 53 | 0.6 | 144 | — | 0 | 8 |
| 7 | 3.2 | 69 | 0.8 | 113 | — | 0 | 11 |
| 8 | 1.7 | 58 | 0.5 | 131 | — | 0 | 8 |
| 9 | 1.8 | 63 | 0.8 | 128 | — | 0 | 7 |
| 10 | 1.9 | 65 | 1.0 | 127 | — | 0 | 7 |
| 11 | 2.7 | 94.1 | 0.7 | 38 | 85 | 4 | 15 |
| 12 | 3.2 | 92.2 | 0.7 | 43 | 60 | 5 | 10 |
| Comp. Ex. 1 | 3.6 | 98.7 | 0.8 | 10 | 125 | 15 | 39 |

| Example | Flexural modulus (kg/cm$^2$) | Flexural yield strength (kg/cm$^2$) | Dielectric tangent (tan δ) | Chemical resistance 97% sulfuric acid | 20% aqueous ammonia | Acetone | Ethyl acetate |
|---|---|---|---|---|---|---|---|
| 1 | $2.2 \times 10^4$ | 730 | $9.1 \times 10^{-5}$ | O | O | O | O |
| 2 | $2.7 \times 10^4$ | 980 | $9.8 \times 10^{-5}$ | '' | '' | '' | '' |
| 3 | $2.5 \times 10^4$ | 850 | $9.3 \times 10^{-5}$ | '' | '' | '' | '' |
| 4 | $1.4 \times 10^4$ | 450 | $8.6 \times 10^{-5}$ | '' | '' | '' | '' |
| 5 | $2.4 \times 10^4$ | 840 | $9.8 \times 10^{-5}$ | '' | '' | '' | '' |
| 6 | $2.2 \times 10^4$ | 1200 | $9.2 \times 10^{-5}$ | '' | '' | '' | '' |
| 7 | $1.3 \times 10^4$ | 930 | $9.0 \times 10^{-5}$ | '' | '' | '' | '' |
| 8 | $2.3 \times 10^4$ | 760 | $9.4 \times 10^{-5}$ | '' | '' | '' | '' |
| 9 | $2.1 \times 10^4$ | 720 | $9.6 \times 10^{-5}$ | '' | '' | '' | '' |
| 10 | $2.0 \times 10^4$ | 700 | $9.5 \times 10^{-5}$ | '' | '' | '' | '' |
| 11 | $0.3 \times 10^4$ | 230 | $1.5 \times 10^{-4}$ | '' | '' | '' | '' |
| 12 | $0.4 \times 10^4$ | 248 | $2.2 \times 10^{-4}$ | '' | '' | '' | '' |
| Comp. Ex. 1 | $0.02 \times 10^4$ | 55 | $2.8 \times 10^{-4}$ | '' | '' | '' | '' |

TABLE 3

| Example | Heat decomposition temperature by TGA (°C.) | Dielectric constant (1 KHz) | Density (g/cm³) |
|---|---|---|---|
| 1 | 380 | 1.9 | 1.021 |
| 2 | 377 | 2.0 | 1.027 |
| 3 | 390 | 2.1 | 1.024 |
| 4 | 385 | 1.9 | 1.015 |
| 5 | 383 | 2.2 | 1.025 |
| 6 | 384 | 2.3 | 1.023 |
| 7 | 390 | 1.9 | 1.016 |
| 8 | 381 | 1.0 | 1.021 |
| 9 | 382 | 2.0 | 1.019 |
| 10 | 374 | 2.1 | 1.018 |
| 11 | 385 | 2.3 | 0.958 |
| 12 | 380 | 2.4 | 0.962 |
| Comp. Ex. 1 | 375 | 2.5 | 0.930 |

EXAMPLES 13-17

The copolymerization reaction conditions were changed as shown in Table 4, and otherwise the same operation as in Example 1 was peformed. The results are shown in Tables 5-1, 5-2 and 5-3.

TABLE 4

| Example | Catalyst VO(OEt)Cl$_2$ (mmoles) | Catalyst Et$_3$Al$_2$Cl$_3$ (mmoles) | DMON (g) | Ethylene gas (l/hr) | Polymerization temperature (°C.) | Amount of the copolymer yielded (g) |
|---|---|---|---|---|---|---|
| 13 | 1 | 10 | 30$^a$ | 28 | 10 | 12.4 |
| 14 | " | " | 30$^a$ | 40 | " | 24.0 |
| 15 | " | " | 30$^a$ | 80 | " | 28.0 |
| 16 | " | " | 30$^b$ | 35 | " | 23.1 |
| 17 | " | " | 30$^b$ | 55 | " | 26.2 |

$^a$2,3-Dimethyl-1,4,5,8-dimethano-1,2,3,4,4a,5,8,8a-octahydronaphthalene
$^b$2,3-Diethyl-1,4,5,8-dimethano-1,2,3,4,4a,5,8,8a-octahydronaphthalene

TABLE 5-1

| Example | [η] 135° C. (dl/g) | Ethylene content (mole %) | Iodine number | Tg (DMA) (°C.) | Tm (DSC) (°C.) | W$^c$ (X-rays) (%) | Haze (%) |
|---|---|---|---|---|---|---|---|
| 13 | 1.13 | 57 | 0.6 | 148 | — | 0 | 5 |
| 14 | 1.60 | 69 | 0.8 | 118 | — | " | 9 |
| 15 | 2.11 | 74 | 0.7 | 106 | — | " | 9 |
| 16 | 1.68 | 64 | 0.7 | 134 | — | " | 7 |
| 17 | 1.94 | 72 | 0.9 | 110 | — | " | 10 |

TABLE 5-2

| Example | Flexural modulus (kg/cm²) | Flexural yield strength (kg/cm²) | Dielectric tangent (tan δ) | Chemical resistance 97% sulfuric acid | Chemical resistance 20% aqueous ammonia | Chemical resistance Acetone | Chemical resistance Ethyl acetate |
|---|---|---|---|---|---|---|---|
| 13 | 2.4 × 10⁴ | 810 | 9.8 × 10⁻⁵ | O | O | O | O |
| 14 | 1.9 × 10⁴ | 650 | 1.1 × 10⁻⁴ | " | " | " | " |
| 15 | 1.6 × 10⁴ | 580 | 1.1 × 10⁻⁴ | " | " | " | " |
| 16 | 2.1 × 10⁴ | 750 | 1.2 × 10⁻⁴ | " | " | " | " |
| 17 | 1.8 × 10⁴ | 600 | 1.0 × 10⁻⁴ | " | " | " | " |

TABLE 5-3

| Example | Heat decomposition temperature by TGA (°C.) | Dielectric constant (1 KHz) | Density (g/cm³) |
|---|---|---|---|
| 13 | 385 | 1.9 | 1.022 |
| 14 | 380 | 2.1 | 1.018 |
| 15 | 373 | 2.2 | 1.014 |
| 16 | 376 | 2.0 | 1.021 |
| 17 | 377 | 2.2 | 1.016 |

EXAMPLE 18

A thoroughly dried 500 ml separable flask was fitted with a stirring vane, a gas blowing inlet tube, a thermometer and a dropping funnel, and thoroughly purged with nitrogen.

Toluene (250 ml) dehydrated and dried by molecular sieve was put into the flask.

While nitrogen was passed through the flask, 3.8 g of compound (a) in Table 6 as DMON, 3.8 g of compound (e) shown in Table 6 as a cyclo-olefin, and 2.5 millimoles of ethyl aluminum sesquichloride were introduced into the flask, and 0.25 millimole of vanadium oxytrichloride (VOCl$_3$) was added to the dropping funnel.

A gaseous mixture composed of dry ethylene (20 liters/hr) and nitrogen (40 liters/hr) was passed into the flask kept at 10° C. for 10 minutes through the gas blowing inlet tube.

From the dropping funnel, ethyl aluminum sesquichloride was added to start the copolymerization. While passing the gaseous mixture, the copolymerization was carried out at 10° C. for 30 minutes.

During the copolymerization, the solution was uniform and transparent, and no precipitation of the copolymer was observed.

Methanol (5 ml) was added to the polymer solution to stop the copolymerization reaction.

The polymer solution after the stopping of the reaction was poured into large amounts of methanol and acetone to precipitate the copolymer. The precipitate was further washed with acetone, and dried in vacuo for one day at 60° C. to obtain 8.1 g of the copolymer.

The copolymer had an ethylene content, measured by $^{13}$C-NMR analysis, of 55 mole %, an intrinsic viscosity, measured in decalin at 135° C., of 4.2 dl/g, an iodine number of 0.7, and a density, measured in accordance with ASTM D1505, of 1.009 g/cm$^3$.

To measure its dynamical properties, the copolymer was molded into sheets having a thickness of 1 and 2 mm by a hot press at 230° C. X-ray diffraction analysis of these sheets shows that no scattering by crystals was observed, and the sheets had a crystallinity (W$^c$) of 0%. Transparency was measured on the 1 mm-thick sheet by a haze meter in accordance with ASTM D1003-52, and found to be 8%. The sample has a refractive index (n$^D$), in accordance with ASTM D542, of 1.527. Flexural modulus and flexural yield strength were measured on the 2 mm-thick press sheet in accordance with ASTM D790, and were found to be 2.2×10$^4$ kg/cm$^2$ and 950 kg/cm$^2$, respectively. The glass transition temperature Tg was found to be 135° C. by measuring the loss modulus E" at a temperature elevating rate of 5° C./min. by a Dynamic Mechanical Analyzer made by Du Pont, and determining Tg from its peak temperature. To determine the melting point Tm, the sample was heated at a rate of 10° C./min. in the range of −120° to 400° C. by DSC (990 type made by Du Pont). The melting curve (peak) was not observed. The sample also had a heat decomposition temperature, measured by a thermobalance (TGA), of 381° C.

The electrical properties of the copolymer were measured at 1 KHz by a dielectric loss measuring device made by Ando Electric Co., Ltd. It was found to have a dielectric constant of 2.1 and a dielectric tangent (tan δ) of 3.0×10$^{-4}$.

To examine the chemical resistance of the sample, the press-formed sheet was immersed at room temperature in sulfuric acid (97%), aqueous ammonia (20%), acetone, and ethyl acetate for 20 hours, and then its appearance was observed. There was no change in color, reduction in transparency, deformation, dissolution, nor cracking.

EXAMPLES 19-28

The copolymerization reaction conditions were changed as shown in Table 7. Otherwise, the same operation as in Example 18 was performed. The results are shown in Tables 8-1 and 8-2. Tables 7, 8-1, and 8-2 also give the conditions and results used and obtained in Example 18.

TABLE 6

| Designation | Compound | |
|---|---|---|
| a | | 2-Methyl-1,4,5,8-dimethano-1,2,3,4,4a,5,8,8a-octahydronaphthalene |
| b | | 2-Ethyl-1,4,5,8-dimethano-1,2,3,4,4a,8,8a-octahydronaphthalene |
| c | | Propylene |
| d | | 1-Butene |
| e | | 5-Ethyl-2-norbornene |
| f | | 5-iso-Butyl-2-norbornene |

TABLE 7

| | catalyst | | Amount of monomers fed | | | | Polymerization | Amount of |
|---|---|---|---|---|---|---|---|---|
| Example | VOCl$_3$ (mmoles) | Al(C$_2$H$_5$)$_{1.5}$Cl$_{1.5}$ (mmoles) | DMON (g) | Ethylene (l/hr) | α-olefin (l/hr) | Cycloolefin (g) | temperature (°C.) | the copolymer yielded (g) |
| 18 | 0.25 | 2.5 | (a) 3.8 | 20 | — | (e) 3.8 | 10 | 8.1 |
| 19 | " | " | (a) 5.0 | " | — | (e) 2.5 | " | 7.9 |
| 20 | " | " | (a) 5.0 | 30 | — | (e) 2.5 | " | 9.4 |
| 21 | " | " | (a) 3.8 | 20 | — | (f) 3.8 | " | 7.8 |
| 22 | " | " | (b) 7.5 | " | (c) 30 | — | " | 4.9 |
| 23 | " | " | (b) 7.5 | 10 | (c) 40 | — | " | 4.0 |
| 24 | " | " | (a) 7.5 | 20 | (c) 30 | — | " | 4.2 |
| 25 | " | " | (b) 3.8 | " | (c) 30 | (f) 3.8 | " | 3.1 |
| 26 | " | " | (b) 3.8 | 30 | (c) 20 | (f) 3.8 | " | 4.2 |
| 27 | " | " | (b) 5.0 | " | (c) 20 | (f) 2.5 | " | 4.5 |
| 28 | " | " | (b) 1.0 | 5 | (c) 5 | — | " | 2.8 |

TABLE 8-1

| Example | [η] (dl/g) | Monomer contents (mole %) | | | | Iodine number | Tg (°C.) | Tm (°C.) | Heat decomposition temperature (°C.) | W$^c$ (%) | Density (g/cm$^3$) | n$^D$ |
|---|---|---|---|---|---|---|---|---|---|---|---|---|
| | | DMON | Ethylene | α-olefin | Cyclo-olefin | | | | | | | |
| 18 | 4.2 | 22 | 55 | — | 23 | 0.7 | 135 | — | 381 | 0 | 1.009 | 1.527 |
| 19 | 3.8 | 30 | 60 | — | 10 | 0.6 | 130 | — | 383 | " | 1.015 | 1.531 |
| 20 | 4.5 | 22 | 69 | — | 9 | 0.7 | 109 | — | 380 | " | 1.006 | 1.526 |
| 21 | 4.1 | " | 57 | — | 21 | 0.9 | 133 | — | 378 | " | 1.008 | 1.525 |
| 22 | 2.0 | 35 | 42 | 23 | — | 1.0 | 121 | — | 370 | " | 1.019 | 1.532 |
| 23 | 1.9 | 38 | 32 | 30 | — | 0.8 | 125 | — | 372 | " | 1.020 | 1.534 |
| 24 | 2.0 | 34 | 49 | 17 | — | 0.9 | 122 | — | 371 | " | 1.015 | 1.532 |
| 25 | 1.3 | 17 | 41 | 22 | 20 | 0.8 | 110 | — | 373 | " | 1.002 | 1.524 |

TABLE 8-1-continued

| Example | [η] (dl/g) | Monomer contents (mole %) | | | | Iodine number | Tg (°C.) | Tm (°C.) | Heat decomposition temperature (°C.) | W$^c$ (%) | Density (g/cm³) | n$^D$ |
|---|---|---|---|---|---|---|---|---|---|---|---|---|
| | | DMON | Ethylene | α-olefin | Cyclo-olefin | | | | | | | |
| 26 | 1.7 | 18 | 49 | 14 | 19 | 1.0 | 106 | — | 375 | " | 1.004 | " |
| 27 | 1.6 | 23 | " | 16 | 12 | 0.9 | 112 | — | 375 | " | 1.010 | 1.527 |
| 28 | 1.8 | 57 | 27 | " | — | 1.0 | 164 | — | 371 | " | 1.027 | 1.540 |

TABLE 8-2

| Example | Haze (%) | Dielectric constant | Dielectric tangent (× 10⁻⁴) | Flexural modulus (kg/cm²) | Flexural yield strength (kg/cm²) | Chemical resistance | | | |
|---|---|---|---|---|---|---|---|---|---|
| | | | | | | 97% sulfuric acid | 20% aqueous ammonia | Acetone | Ethyl acetate |
| 18 | 8 | 2.1 | 3.0 | 22000 | 950 | O | O | O | O |
| 19 | 9 | 2.2 | 4.5 | 20000 | 1030 | " | " | " | " |
| 20 | 10 | 2.1 | 3.6 | 17000 | 1010 | " | " | " | " |
| 21 | 8 | 2.1 | 4.0 | 21000 | 980 | " | " | " | " |
| 22 | " | 2.3 | 4.4 | 16000 | 600 | " | " | " | " |
| 23 | 9 | 2.4 | 4.5 | 18000 | 650 | " | " | " | " |
| 24 | " | 2.3 | 4.1 | 16000 | 780 | " | " | " | " |
| 25 | 8 | 2.4 | 4.2 | 19000 | 680 | " | " | " | " |
| 26 | 7 | 2.3 | 3.8 | 18000 | 700 | " | " | " | " |
| 27 | 9 | 2.4 | 3.9 | " | 720 | " | " | " | " |
| 28 | 10 | 2.4 | 4.6 | 28000 | 950 | " | " | " | " |

EXAMPLE 29

The same copolymerization as in Example 18 was carried out except that 60 g of 2-methyl-1,4,5,8-dimethano-1,2,3,4,4a,5,8,8a-octahydronaphthalene, 100 millimoles of ethyl aluminum sesquichloride and 10 millimoles of dichloroethoxyoxovanadium were used, the flow rate of ethylene was changed to 320 liters/hr, hydrogen was used instead of nitrogen at a flow rate of 280 liters/hr, and the polymerization temperature was changed to 30° C.

There was obtained 17.2 g of a copolymer having an ethylene content of 60 mole %, an intrinsic viscosity, measured in decalin at 135° C., of 0.15 dl/g, and an iodine number of 0.9. The viscosity of the copolymer, measured at 750 rpm and 280° C. by an Emila-rheometer (imported by Yagami Co., Ltd.), was 2.2×10³ centipoises.

The copolymer was molded into a press sheet having a thickness of 1 mm at 200° C. The sheet was considerably brittle. It had a crystallinity (w$^c$), determined by X-ray diffraction, of 0%. When it was subjected to a differential scanning calorimeter (Type 990 made by Du Pont) at a temperature elevating rate of 5° C./min., no melting peak was observed. The softening temperature of the copolymer, measured by a needle penetration degree measuring device of Du Pont (TMA: thermomechanical analyzer, load 49 g, quartz needle with a diameter of 0.025 mm) at a temperature elevating rate of 10° C./min., was 126° C. The copolymer had a haze, determined substantially in accordance with ASTM D1003-52, of 11%. To examine its chemical resistance, the sample was immersed for 20 hours in 97% sulfuric acid, 20% aqueous ammonia, acetone and methyl acetate, and its appearance was then observed. To reduction in color and transparency was observed.

EXAMPLE 30

A thoroughly dried 500 ml separable flask was fitted with a stirring vane, a gas blowing inlet tube, a thermometer and a dropping funnel, and thoroughly purged with nitrogen.

Toluene (250 ml) dehydrated and dried by molecular sieve was put into the flask.

While nitrogen was passed through the flask, 7.5 g of the compound (g) in Table 9, and 2.5 millimoles of ethyl aluminum sesquichloride were introduced into the flask, and 0.25 millimole of dichloroethoxyoxovanadium was added to the dropping funnel.

A gaseous mixture composed of dry ethylene (10 liters/hr) and nitrogen (40 liters/hr) was passed into the flask kept at 10° C. for 10 minutes through the gas blowing inlet tube.

From the dropping funnel, dichloroethoxyoxovanadium was added to start the copolymerization. While passing the gaseous mixture, the copolymerization was carried out at 10° C. for 30 minutes.

During the copolymerization, the solution was uniform and transparent, and no precipitation of the copolymer was observed.

Methanol (5 ml) was added to the polymer solution to stop the copolymerization reaction.

The polymer solution after the stopping of the reaction was poured into large amounts of methanol and acetone to precipitate the copolymer. The precipitate was further washed with methanol and acetone, and dried in vacuo for one day at 60° C. to obtain 5.3 g of the copolymer.

The copolymer had an ethylene content, measured by $^{13}C$-NMR analysis, of 59 mole %, an intrinsic viscosity, measured in decalin at 135° C. of 1.4 dl/g, and an iodine number of 0.9.

To measure its dynamical properties, the copolymer was molded into sheets having a thickness of 1 and 2 mm by a hot press at 230° C. X-ray diffraction analysis of these sheets shows that no scattering by crystals was observed, and the sheets had a crystallinity (W$^c$) of 0%. Transparency was measured on the 1 mm-thick sheet by a haze meter in accordance with ASTM D1003-52, and found to be 9%. Flexural modulus and flexural yield strength were measured on the 2 mm-thick press sheet in accordance with ASTM D790, and were found to be 2.5×10⁴ kg/cm² and 810 kg/cm², respectively. The glass transition temperature Tg was found to be 150° C.

by measuring the loss modulus E" at a temperature elevating rate of 5° C./min. by a dynamic mechanical analyzer (DMA) made by Du Pont, and determining Tg from its peak temperature. To determine the melting point Tm, the sample was heated at a rate of 10° C./min. in the range of −120° to 400° C. by DSC (990 type made by Du Pont). The melting curve (peak) was not observed.

The electrical properties of the copolymer were measured at 1 KHz by a dielectric loss measuring device made by Ando Electric Co., Ltd. It was found to have a dielectric constant of 1.9 and a dielectric tangent (tan δ) of $2.3 \times 10^{-4}$.

To examine the chemical resistance of the copolymer, the press-formed sheet was immersed at room temperature in sulfuric acid (97%), aqueous ammonia (20%), acetone, and ethyl acetate for 20 hours, and then its appearance was observed. There was no change in color, reduction in transparency, deformation, dissolution, nor cracking.

The copolymer also had a density, determined by the density gradient tube method, of 1.032 g/cm$^3$, a refractive index (n$^D$), measured by an Abbe refractometer, of 1.540, and a pencil hardness, as a measure of hardness, of H.

EXAMPLES 31–42

The same operation as in Example 30 was carried out except that the monomers were changed as indicated in Table 9, and the copolymerization conditions were changed as shown in Table 10. The results are shown in Tables 11 and 12. Tables 10, 11 and 12 also show the conditions and the results used and obtained in Example 30.

TABLE 9

| Designation | Compound | |
|---|---|---|
| g | (structure with C$_2$H$_5$) | 12-Ethyl-hexacyclo-[6,6,1,1$^{3,6}$,1$^{10,13}$,0$^{2,7}$,-0$^{9,14}$]heptadecene-4 |
| h | (structure with CH$_3$) | 12-Methyl-hexacyclo-[6,6,1,1$^{3,6}$,1$^{10,13}$,0$^{2,7}$,-0$^{9,14}$]heptadecene-4 |
| i | (structure with CH$_2$CH(CH$_3$)$_2$) | 12-iso-Butyl-hexacyclo-[6,6,1,1$^{3,6}$,1$^{10,13}$,0$^{2,7}$,-0$^{9,14}$]heptadecene-4 |
| j | (structure with CH$_3$) | 9-Methyl-tetracyclo-[4,4,0,1$^{2,5}$,1$^{7,10}$]-dodecene-3 |
| k | (structure) | Hexacyclo[6,6,1,1,1,0,0]-heptadecene-4 |

TABLE 10

| | Catalyst | | Amounts of monomers fed | | Polymerization | Amount of |
|---|---|---|---|---|---|---|
| Example | VO(OC$_2$H$_5$)Cl$_2$ (mmoles) | Al(C$_2$H$_5$)$_{1.5}$Cl$_{1.5}$ (mmoles) | Ethylene (l/hr) | Polycyclic monomer (g) | temperature (°C.) | the copolymer yielded (g) |
| 30 | 0.25 | 2.5 | 20 | g | 7.5 | 10 | 5.3 |
| 31 | " | " | 30 | g | " | " | 6.3 |
| 32 | " | " | 10 | g | " | " | 4.2 |
| 33 | " | " | 20 | h | " | " | 5.2 |
| 34 | " | " | 30 | h | " | " | 6.0 |
| 35 | " | " | 20 | i | " | " | 4.9 |
| 36 | " | " | 30 | i | " | " | 5.7 |
| 37 | " | " | 10 | g/j | 5.0/2.5 | " | 3.9 |
| 38 | " | " | 20 | g/j | " | " | 5.7 |
| 39 | " | " | 10 | k | 7.5 | " | 3.6 |
| 40 | " | " | 20 | k | " | " | 4.8 |
| 41 | " | " | 30 | k | " | " | 5.9 |
| 42* | 3.0 | 30 | 90 | k | 20 | 30 | 3.2 |

*Instead of N$_2$, H$_2$ was passed at 150 liters/hr.

TABLE 11

| Example | [η] (dl/g) | Ethylene content (mole %) | Iodine number | Tg (DMA) (°C.) | Tm (DSC) (°C.) | W$^c$ (X-rays) (%) | Heat decomposition temperature by TGA (°C.) | Density (g/cm$^3$) |
|---|---|---|---|---|---|---|---|---|
| 30 | 1.4 | 59 | 0.9 | 150 | — | 0 | 383 | 1.032 |
| 31 | 1.6 | 65 | 1.0 | 134 | — | 0 | 388 | 1.030 |
| 32 | 1.1 | 49 | 0.7 | 173 | — | 0 | 385 | 1.033 |
| 33 | 1.2 | 57 | 0.7 | 153 | — | 0 | 384 | 1.033 |
| 34 | 1.6 | 67 | 1.0 | 133 | — | 0 | 380 | 1.025 |
| 35 | 1.3 | 60 | 0.9 | 148 | — | 0 | 381 | 1.031 |
| 36 | 1.6 | 68 | 0.8 | 130 | — | 0 | 382 | 1.025 |
| 37*[1] | 1.4 | 47 | 0.9 | 170 | — | 0 | 388 | 1.035 |
| 38*[2] | 2.0 | 58 | 1.1 | 151 | — | 0 | 385 | 1.028 |
| 39 | 1.2 | 48 | 1.0 | 171 | — | 0 | 389 | 1.033 |
| 40 | 1.5 | 57 | 0.9 | 156 | — | 0 | 385 | 1.029 |
| 41 | 1.8 | 64 | 0.8 | 138 | — | 0 | 383 | 1.026 |

TABLE 11-continued

| Example | [η] (dl/g) | Ethylene content (mole %) | Iodine number | Tg (DMA) (°C.) | Tm (DSC) (°C.) | W^c (X-rays) (%) | Heat decomposition temperature by TGA (°C.) | Density (g/cm³) |
|---|---|---|---|---|---|---|---|---|
| 42 | 0.08 | 58 | 0.9 | 140*³ | — | 0 | 379 | 1.030 |

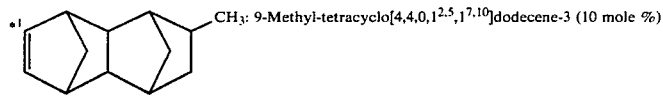
*¹ CH₃: 9-Methyl-tetracyclo[4,4,0,1$^{2,5}$,1$^{7,10}$]dodecene-3 (10 mole %)

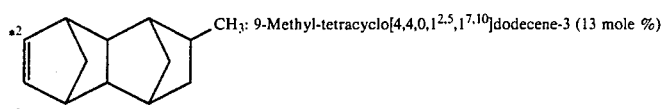
*² CH₃: 9-Methyl-tetracyclo[4,4,0,1$^{2,5}$,1$^{7,10}$]dodecene-3 (13 mole %)

*³Softening point

TABLE 12

| Example | Reflactive index (n$^D$) | Dielectric constant at 1 KHz | Dielectric tangent at 1 KHz (× 10$^{-4}$) | Flexural modulus (kg/cm²) × 10$^{-4}$ | Flexural yield strength (kg/cm²) | Pencil hardness | Haze (%) | Chemical resistance 97% sulfuric acid | 20% aqueous ammonia | Acetone | Ethyl acetate |
|---|---|---|---|---|---|---|---|---|---|---|---|
| 30 | 1.540 | 1.9 | 2.3 | 2.5 | 810 | H | 9 | O | O | O | O |
| 31 | 1.539 | 1.9 | 2.1 | 2.3 | 930 | H | 8 | " | " | " | " |
| 32 | 1.544 | 2.0 | 2.6 | 2.9 | 1050 | 2H | 10 | " | " | " | " |
| 33 | 1.541 | 2.1 | 2.8 | 2.6 | 860 | H | 6 | " | " | " | " |
| 34 | 1.536 | 2.2 | 3.1 | 2.1 | 850 | HB | 8 | " | " | " | " |
| 35 | 1.544 | 2.4 | 3.2 | 2.6 | 890 | H | 7 | " | " | " | " |
| 36 | 1.534 | 2.3 | 3.2 | 2.1 | 800 | HB | 6 | " | " | " | " |
| 37 | 1.544 | 2.3 | 3.1 | 2.8 | 950 | 2H | 7 | " | " | " | " |
| 38 | 1.540 | 2.4 | 3.3 | 2.6 | 850 | H | 8 | " | " | " | " |
| 39 | 1.543 | 2.5 | 3.4 | 2.8 | 1100 | 2H | 8 | " | " | " | " |
| 40 | 1.540 | 2.3 | 2.5 | 2.5 | 780 | H | 8 | " | " | " | " |
| 41 | 1.539 | 2.3 | 2.7 | 2.2 | 870 | HB | 7 | " | " | " | " |
| 42 | 1.541 | 2.4 | 2.5 | — | — | 2B | 9 | " | " | " | " |

EXAMPLE 43

A thoroughly dried 500 ml separable flask was fitted with a stirring vane, a gas blowing inlet tube, a thermometer and a dropping funnel, and thoroughly purged with nitrogen.

Toluene (250 ml) dehydrated and dried by molecular sieve was put into the flask.

While nitrogen was passed through the flask, 7.5 g of pentacyclo[6,5,1,1$^{3,6}$,O$^{2,7}$,O$^{9,13}$]pentadecene-4 and 2.5 millimoles of ethyl aluminum sesquichloride were introduced into the flask, and 0.25 millimole of dichloroethoxyoxovanadium was added to the dropping funnel.

A gaseous mixture composed of dry ethylene (20 liters/hr) and nitrogen (40 liters/hr) was passed into the flask kept at 10° C. for 10 minutes through the gas blowing inlet tube.

From the dropping funnel, dichloroethoxyoxovanadium was added to start the copolymerization. While passing the gaseous mixture, the copolymerization was carried out at 10° C. for 30 minutes.

During the copolymerization, the solution was uniform and transparent, and no precipitation of the copolymer was observed.

Methanol (3 ml) was added to the polymer solution to stop the copolymerization reaction.

The polymer solution after the stopping of the reaction was poured into large amounts of methanol and acetone to precipitate the copolymer. The precipitate was further washed with methanol and acetone, and dried in vacuo for one day at 60° C. to obtain 7.2 g of the copolymer.

The copolymer had an ethylene content, measured by ¹³C-NMR analysis, of 55 mole %, an intrinsic viscosity, measured in decalin at 135° C., of 2.1 dl/g, and an iodine number of 0.7.

To measure its dynamical properties, the copolymer was molded into sheets having a thickness of 1 and 2 mm by a hot press at 230° C. X-ray diffraction analysis of these sheets shows that no scattering by crystals was observed, and the sheets had a crystallinity (W$^c$) of 0%. Transparency was measured on the 1 mm-thick sheet by a haze meter in accordance with ASTM D1003-52, and found to be 8%. Flexural modulus and flexural yield strength were measured on the 2 mm-thick press sheet in accordance with ASTM D790, and were found to be $2.5 \times 10^4$ kg/cm² and 850 kg/cm², respectively. The glass transition temperature Tg was found to be 149° C. by measuring the loss modulus E" at a temperature elevating rate of 5° C./min. by a Dynamic Mechanical Analyzer made by Du Pont, and determining Tg from its peak temperature. To determine the melting point Tm, the sample was heated at a rate of 10° C./min. in the range of −120° to 400° C. by DSC (990 type made by Du Pont). The melting curve (peak) was not observed.

The electrical properties of the copolymer were measured at 1 KHz by a dielectric loss measuring device made by Ando Electric Co., Ltd. It was found to have a dielectric constant of 2.0 and a dielectric tangent (tan δ) of $2.8 \times 10^{-4}$.

To examine the chemical resistance of the press-formed sheet, it was immersed at room temperature in sulfuric acid (97%), aqueous ammonia (20%), acetone, and ethyl acetate for 20 hours, and then its appearance was observed. There was no change in color, reduction in transparency, deformation, dissolution, nor cracking.

The copolymer also had a heat decomposition temperature (the weight loss initiation temperature), determined by a thermobalance, of 390° C., a density, determined at 23° C. by the density gradient method, of 1.025 g/cm², a refractive index ($n^D$), measured by an Abbe refractometer, of 1.536, and a pencil hardness, as a measure of surface hardness, of H.

EXAMPLES 44–48

The same operation as in Example 43 was carried out except that the monomer components were changed as shown in Table 13, and the copolymerization conditions were changed as shown in Table 13. The results are shown in Tables 13, 14 and 15.

or an alkyl group, or $R_1$ and $R_2$ may be bonded to each other to form a trimethylene group or a group represented by the following formula

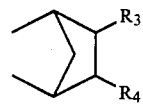

in which $R_3$ and $R_4$ are identical of different and each represents a hydrogen atom, a halogen atom or an alkyl group, (B) the mole ratio of polymerized units derived from

TABLE 13

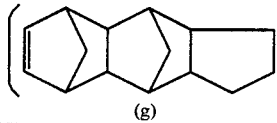

| | Catalyst | | | Polycyclic monomer | | |
|---|---|---|---|---|---|---|
| Example | VO(OC₂H₅)Cl₂ (mmoles) | Al(C₂H₅)₁.₅Cl₁.₅ (mmoles) | Ethylene (l/hr) | (g) | Polymerization temperature (°C.) | Amount of the copolymer yielded (g) |
| 43 | 0.25 | 2.5 | 20 | 7.5 | 10 | 6.5 |
| 44 | " | " | 8 | " | " | 5.2 |
| 45 | " | " | 30 | " | " | 7.0 |
| 46 | " | " | 40 | " | " | 7.8 |
| 47(*1) | 2.5 | 25 | 80 | 15 | 30 | 3.8 |
| 48(*2) | 2.5 | " | 80 | " | " | 3.7 |

(*1)Instead of N₂, H₂ was passed at 80 liters/hr.
(*2)Instead of N₂, H₂ was passed at 200 liters/hr.

TABLE 14

| Example | [η] (dl/g) | Ethylene content (mole %) | Iodine number | Tg (DMA) (°C.) | Softening temperature (TMA) (°C.) | Tm (DSC) (°C.) | $W^c$ (X-rays) (%) | Heat decomposition temperature by TGA (°C.) | Density (g/cm³) |
|---|---|---|---|---|---|---|---|---|---|
| 43 | 2.1 | 55 | 0.7 | 149 | — | — | 0 | 390 | 1.025 |
| 44 | 1.7 | 45 | 0.5 | 171 | — | — | 0 | 394 | 1.026 |
| 45 | 2.3 | 63 | 1.0 | 128 | — | — | 0 | 395 | 1.024 |
| 46 | 3.0 | 72 | 0.8 | 100 | — | — | 0 | 383 | 1.020 |
| 47 | 0 10 | 59 | 0.9 | — | 128 | — | 0 | 370 | 1.021 |
| 48 | 0.07 | 57 | 0.8 | — | 129 | — | 0 | 372 | 1.021 |

TABLE 15

| Example | Reflactive index ($n^D$) | Dielectric constant at 1 KHz | Dielectric tangent at 1 KHz (× 10⁻⁴) | Flexural modulus (kg/cm²) ×10⁻⁴ | Flexural yield strength (kg/cm²) | Pencil hardness | 97% sulfuric acid | 20% aqueous ammonia | Acetone | Ethyl acetate |
|---|---|---|---|---|---|---|---|---|---|---|
| 43 | 1.536 | 2.0 | 2.8 | 2.5 | 850 | HB | O | O | O | O |
| 44 | 1.539 | 1.9 | 2.5 | 2.7 | 1010 | H | " | " | " | " |
| 45 | 1.534 | 2.1 | 2.9 | 2.2 | 880 | HB | " | " | " | " |
| 46 | 1.530 | 2.2 | 3.0 | 1.9 | 680 | B | " | " | " | " |
| 47 | 1.534 | 2.3 | 3.0 | — | — | 2B | " | " | " | " |
| 48 | 1.534 | 2.2 | 3.5 | — | — | 2B | " | " | " | " |

What is claimed is:
1. A novel random copolymer, characterized in that
(A) it comprises ethylene and a 1,4,5,8-dimethano-1,2,3,4,4a,5,8,8a-octahydronaphthalene represented by the following formula (1)

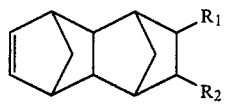

(1)

wherein $R_1$ and $R_2$ are identical and different and each represents a hydrogen atom, a halogen atom 1,4,5,8-dimethano-1,2,3,4,4a,5,8,8a-octahydronaphthalene to polymerized units derived from ethylene is from 3:97 to 95:5, and (C) the 1,4,5,8-dimethano-1,2,3,4,4a,5,8,8a-octahydronaphthalene is incorporated in the polymer chain as polymerized units represented by the following formula (2)

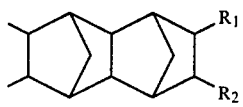

wherein R₁ and R₂ are as defined above.

2. The random copolymer of claim 1 which has an intrinsic viscosity, measured in decalin at 135° C., of 0.005 to 20 dl/g.

3. The random copolymer of claim 1 wherein in formula (1), at least one of R₁ and R₂ is an alkyl group.

4. A novel random copolymer, characterized in that
(A) it comprises at least one 1,4,5,8-dimethano-2,3,4,4a,5,8,8a-octahydronaphthalene of the following formula (1)

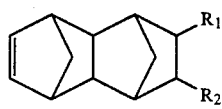

wherein R₁ and R₂ are identical and different and each represents a hydrogen atom, a halogen atom or an alkyl group, or R₁ and R₂ may be bonded to each other to form a trimethylene group or a group represented by the following formula

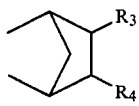

in which R₃ and R₄ are identical or different and each represents a hydrogen atom, a halogen atom or an alkyl group,
ethylene and at least one compound selected from the group consisting of alpha-olefins having at least 3 carbon atoms and cycloolefins,
(B) the mole ratio of polymerized units from the 1,4,5,8-dimethano-1,2,3,4,4a,5,8,8a-octahydronaphthalene to polymerized units from ethylene is from 3:97 to 95:5,
(B') the mole ratio of polymerized units from at least on selected from the group consisting of alpha-olefins having at least 3 carbon atoms and cycloolefins to the polymerized units from the 1,4,5,8-dimethano-1,2,3,4,4a,5,8,8a-octahydronaphthalene is from 95:5 to 20:80, and
(C) the 1,4,5,8-dimethano-1,2,3,4,4a,5,8,8a-octahydronaphthalene is incorporated in the polymer chain as polymerized units represented by the following formula (2)

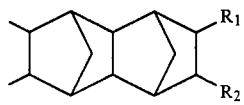

wherein R₁ and R₂ are as defined hereinabove.

5. The random copolymer of claim 4 which has an intrinsic viscosity, measured in decalin at 135° C., of 0.005 to 20 dl/g.

6. The random copolymer of claim 4 wherein at least one of R₁ and R₂ is an alkyl group.

7. A process for producing a random copolymer comprising ethylene and a 1,4,5,8-dimethano-1,2,3,4,4a,5,8,8a-octahydronaphthalene represented by the following formula (1)

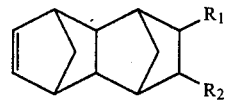

wherein R₁ and R₂ are identical and different and each represents a hydrogen atom, a halogen atom or an alkyl group, or R₁ and R₂ may be bonded to each other to form a trimethylene group or a group represented by the following formula

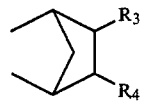

in which R₃ and R₄ are identical or different and each represents a hydrogen atom, a halogen atom or an alkyl group,
the mole ratio of polymerized units derived from 1,4,5,8-dimethano-1,2,3,4,4a,5,8,8a-octahydronaphthalene to polymerized units derived from ethylene being from 3:97 to 95:5, and the 1,4,5,8-dimethano-1,2,3,4,4a,5,8,8a-octahydronaphthalene being incorporated in the polymer chain as polymerized units represented by the following formula (2)

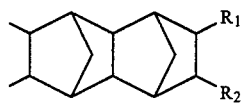

wherein R₁ and R₂ are as defined above; which comprises copolymerizing ethylene with said 1,4,5,8-dimethano-1,2,3,4,4a,5,8,8a-octahydronaphthalene in a hydrocarbon medium in the presence of a catalyst formed from a vanadium compound and an organoaluminum compound which are soluble in the hydrocarbon medium.

8. The process of claim 7 wherein the random copolymer has an intrinsic viscosity, measured in decalin at 135° C., of 0.005 to 20 dl/g.

9. The process of claim 7 wherein in formula (1), at least one of R₁ and R₂ is an alkyl group.

10. The random copolymer of claim 1 wherein the 1,4,5,8-dimethano-1,2,3,4,4a, 5,8,8a-octahydronaphtalene of formula (1) is selected from the group consisting of 1,4,5,8-dimethano-1, 2,3,4,4a,5,8,8a-octahydronaphtalene, 2-methyl-1, 4,5,8-dimethano-1,2,3,4,4a,5,8,8a-octahydronaphtalene, 2-ethyl-1,4,5,8-dimethano-1,2,3,4,4a,5,8,8a-octahydronaphtalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphtalene, 2-stearyl-1,4,5,8-dimethano-1,2,3,4,4a,5,8,8a-octahydronaphtalene 2-decyl-1,4,5,8-dimethano-1,2,3,4,4a,5,8,8a-octahydronaphtalene, 2, 3-dimethyl-1,4,5,8-dimethano-1,2,3,4,4a,5,8,8a-octahydronaphtalene, 2, 3-dimethyl-3-ethyl-1,4,5,8-dimethano-1,2,3,4,4a,5,8,8a-octahydronaphtalene, 2-methyl-3-ethyl-1,4,5,8-dimethano-1,2,3,4,4a,5,8,8a-octahydronaphtalene, 2-chloro-1,4,5,8-dimethano- 1,2,3,4,4a,5,8,8a-octahydronaphtalene, 2-bromo-1,4,5,8-dimethano-1,2,3,4,4a,5,8,8a-octahydronaphtalene, 2-fluro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-isobutyl-1,4,5,8-dimethano-1,2,3,4,4a,5,8,8a-octahydronaphtalene, 2,3-dichloro-1,4,5,8-dimethano-1,2,3,4,4a,5,8, 8a-octahydronaphthalene, 12-ethyl-hexacyclo[6,6,1,1$^{3,6}$,1$^{10,13}$,0$^{2,7,09}$,14-heptadecene-4, 12-methyl-hexacyclo[6,6,1,1$^{3,6}$,1$^{10,13}$,O$^{2,7,09,14}$]-heptadecene-4, 12-isobutyl-hexacyclo-6,6,1,1$^{3,6}$,1$^{10,13}$,O$^{2,7}$,O$^{9,14}$]-heptadecene-4, hexacyclo[6,6,1,1$^{3,6}$,1$^{10,13}$,O$^{2,7}$,O$^{9,14}$]heptadecene-4, pentacyclo[6,5,1,1$^{3,6}$,O$^{2,7,9,13}$]pentadecene-4 and mixtures thereof.

11. The random copolymer of claim 3 wherein the alkyl group has from 1 to 10 carbon atoms.

12. The random copolymer of claim 1 wherein the mole ration of polymerized units derived from 1,4,5,8-dimethano-1,2,3,4,4a,5, 8, 8a-octahydronaphthalene to polymerized units derived from ethylene is from 5:95 to 80:20.

13. The random copolymer of claim 1 wherein the mole ration of polymerized units derived from 1,4,5,8-dimethano-1,2,3,4,4a,5,8,8a-octahydronaphthalene to polymerized units derived from ethylene is from 10:90 to 80:20.

14. The random copolymer of claim 2 wherein the intrinsic viscosity is from 0.01 to 15 dl/g.

15. The random copolymer of claim 1 in which the mole ratio of the polymerized units from the 1,4,5,8a-dimethano-1,2,3,4,4a,5,8,8a-octahydronaphtalene to the polymerized units from ethylene is from 10:90 to 90:10, said copolymer having an intrinsic viscosity, measured in decalin at 135° C., of 0.3 to 15 dl/g, a crystallinity, determined by X-ray diffraction, of not more than 25%, a melting point, measured by a differential scanning calorimeter, of not more than 128° C., and a glass transition temperature measured by a dynamic mechanical analyzer of at least 80° C.

16. The random copolymer of claim 15 wherein the mole ration is from 15:85 to 80:20, the intrinsic viscosity is from 0.5 to 10 dl/g, the crystallinity is not more than 10%, the melting point is not more than 100° C., and the glass transition temperature is from 100° to 220° C.

17. The random copolymer of claim 1 in which the mole ratio of the polymerized units from the 1,4,5,8-dimethano-1,2,3,4,4a,5,8,8a-octahydronaphtalene to the polymerized units from ethylene is from 10:90 to 90:10, said copolymer having an intrinsic viscosity, measured in decalin at 135° C., of 0.05 to 0.3 dl/g, a crystallinity, determined by X-ray diffraction, of not more than 25%, a melting point, measured by a differential scanning calorimeter, of not more than 128° C., a glass transistion temperature measured by a dynamic mechanical analyzer of at least 80° C., and a viscosity at 180° C. of 100 to $2 \times 10^5$ centipoises.

18. The random copolymer of claim 17 wherein the mole ratio is from 15:85 to 80:20, the intrinsic viscosity is from 0.01 to 0.3 dl/g, the crystallinity is not more than 10%, the melting point is not more than 100° C., the glass transition temperature is from 100 to 220° C., and the viscosity is from 100 to $2 \times 10^4$ centipoises.

19. The random copolymer of claim 1 in which the mole ratio of the polymerized units from the 1,4,5,8a-dimethano-1,2,3,4,4a,5,8,8a-octahydronaphytalene to the polymerized units from ethylene is from 3:97 to 20:80, and the copolymer has an intrinsic voscosity, measured in decalin at 135° C., of 0.3 to 20 dl/g, a crystallinity, determined by X-ray diffraction of not more than 10%, a melting point, measured by a differential scanning calorimeter, of not more than 128° C., and a glass transition temperature, measured by a dynamic mechanical analyzer of 25° to 100° C.

20. The random copolymer of claim 19 in which the mole ratio is from 5:95 to 10:90, the intrinsic viscosity is from 1.0 to 20 dl/g, the crystallinity is not more than 5%, the melting point is not more than 100° C., and the glass transition temperature is from 30° to 80° C.

21. The random copolmer of claim 4 which comprises an alpha-oelfin having from 3 to 12 carbon atoms.

22. The random copolymer of claim 4 which comprises a cycloolefin selected from the group consisting of cyclobutene, cyclopentene, cyclohexene, 3,4-dimethylcyclopentene, 3-methylcyclohexene, 2-(2-methylbutyl)-1-cyclohexene, styrene, alpha-methylstyrene, norbornene, methylnorbornene, ethylnorbornene, isobutylnorbornene, 2,3,3a,7a-tetrahydro-4,7-methano-1H-indene and 3a,5,6,7a-tetrahydro- 4,7-methano-1H-indene.

23. The random copolymer of claim 4 which comprises a cycloolefin selected from the group consisting of norbornene, 5-methyl-2-norbornene, 5-ethyl-2-norbornene, and 5-isobutyl-2-norbornene.

24. The random copolymer of claim 5 which has an iodine number of not more than 5, a crystallinity of not more than 40%, a melting point, determined by a differential scanning calorimeter, of not more than 135° C., a glass transition temperature of at least 2° C., a heat decomposition temperature in the range of from 350° to 420 ° C., a flexular modulus in the range of $1 \times 10^4$ to $3 \times 10^4$ kg/cm$^2$, a flexular yield strength of from 300 to 1500 kg/cm$^2$, a density of at least about 0.86 g/cm$^3$, a refractive index of 1.47 to 1.58, a dielectric constant of 1.5 to 4.0 and a dielectric tangent of $5 \times 10^{-3}$ to $5 \times 10^{-5}$.

* * * * *

UNITED STATES PATENT AND TRADEMARK OFFICE
CERTIFICATE OF CORRECTION

PATENT NO. : 4,614,778  Page 1 of 3
DATED : September 30, 1986
INVENTOR(S) : Hirokazu Kajiura, et al.

It is certified that error appears in the above—identified patent and that said Letters Patent is hereby corrected as shown below:

IN THE CLAIMS

Claim 1, line 12, (column 30, line 10),
  delete "of", insert --or--.

Claim 4, line 3, (column 31, line 16),
  before "2", insert --1--.

line 23, (column 31, line 47),
  delete "on", insert --one compound--.

Claim 10, line 2, (column 32, line 53),
          line 4-5, (column 32, line 55-56),
          line 6, (column 32, line 57),
          line 7, (column 32, line 58),
          line 9-10, (column 32, line 60-61),
          line 11, (column 32, line 62),
          line 12, (column 32, line 63),
          line 14, (column 32, line 65),
          line 15, (column 32, line 66),
          line 18, (column 33, line 1),
          line 19, (column 33, line 2),
  delete "octahydronaphtalene",
  insert --octahydronaphthalene--.

UNITED STATES PATENT AND TRADEMARK OFFICE
CERTIFICATE OF CORRECTION

PATENT NO. : 4,614,778

DATED : September 30, 1986

INVENTOR(S) : Hirokazu Kajiura, et al.

It is certified that error appears in the above-identified patent and that said Letters Patent is hereby corrected as shown below:

Claim 10, line 26, (column 33, line 9),
  delete "[6,6,1,13,6,110,13,02,7,09,14",
  insert --$[6,6,1,1^{3,6},1^{10,13},0^{2,7},0^{9,14}]$--.

line 27, (column 33, line 10),
  delete "$[6,6,1,1^{3,6},1^{10,13},0^{2,7},0^{9,14}]$",
  insert --$[6,6,1,1^{3,6},1^{10,13},0^{2,7},0^{9,14}]$--.

line 28, (column 33, line 11),
  after "hexacyclo",
  delete "-", insert --[--.

line 28-29, (column 33, line 11-12),
line 29-30, (column 33, line 12-13),
  delete "$0^{2,7}$,", insert --$0^{2,7}$--.

Claim 13, line 3, (column 33, line 24),
  delete "octahydronaphtalene",
  insert --octahydronaphthalene--.

Claim 15, line 3, (column 33, line 31),
  delete "octahydronaphtalene",
  insert --octahydronaphthalene--.

UNITED STATES PATENT AND TRADEMARK OFFICE
CERTIFICATE OF CORRECTION

PATENT NO. : 4,614,778 Page 3 of 3

DATED : September 30, 1986

INVENTOR(S) : Hirokazu Kajiura, et al.

It is certified that error appears in the above-identified patent and that said Letters Patent is hereby corrected as shown below:

```
Claim 17, line 3, (column 33, line 47),
   delete "octahydronaphtalene",
   insert --octahydronaphthalene--.

Claim 19, line 3, (column 34, line 12),
   delete "octahydronaphtalene",
   insert --octahydronaphthalene--.
```

Signed and Sealed this

Thirtieth Day of December, 1986

Attest:

DONALD J. QUIGG

Attesting Officer

Commissioner of Patents and Trademarks